(12) United States Patent
Paperi

(10) Patent No.: US 11,148,578 B2
(45) Date of Patent: Oct. 19, 2021

(54) UNIVERSAL MOUNTING TABS AND KITS FOR AUTOMOTIVE COMPONENTS

(71) Applicant: Maurice Paperi, Macomb, MI (US)

(72) Inventor: Maurice Paperi, Macomb, MI (US)

( * ) Notice: Subject to any disclaimer, the term of this patent is extended or adjusted under 35 U.S.C. 154(b) by 0 days.

(21) Appl. No.: 16/362,668

(22) Filed: Mar. 24, 2019

(65) Prior Publication Data

US 2019/0291632 A1  Sep. 26, 2019

Related U.S. Application Data

(60) Provisional application No. 62/647,787, filed on Mar. 25, 2018.

(51) Int. Cl.
*B60R 11/00* (2006.01)
*B60Q 1/04* (2006.01)
*B60R 11/06* (2006.01)

(52) U.S. Cl.
CPC ......... *B60Q 1/0483* (2013.01); *B60Q 1/0433* (2013.01); *B60R 11/00* (2013.01); *B60R 11/06* (2013.01); *B60R 2011/0005* (2013.01); *B60R 2011/0047* (2013.01); *B60R 2011/0052* (2013.01); *B60R 2011/0066* (2013.01); *B60R 2011/0094* (2013.01); *Y10T 29/49618* (2015.01)

(58) Field of Classification Search
CPC ............ B60R 11/06; B60R 2011/0047; B60R 2011/0094; B60R 19/24; B60R 13/0206; B60R 2011/0061; B60R 2011/0066; B60R 2011/0073; B60R 11/00; B60R 1/006; B60R 2011/0049; B60R 2011/0064; B60Q 1/0064; B60Q 1/0408; B60Q 1/0433; B60Q 1/0441; B60Q 1/045; B60Q 2900/10; B60Q 2900/20; Y10T 29/4973; Y10T 29/49723; Y10T 29/49735; Y10T 29/49726; Y10T 29/49732; Y10T 29/49618; Y10T 29/49718

See application file for complete search history.

(56) References Cited

U.S. PATENT DOCUMENTS

| | | |
|---|---|---|
| 2,797,967 A | 7/1957 | Irvin |
| 2,883,228 A | 4/1959 | Roberts |
| 3,377,525 A | 4/1968 | Bradstock |
| 3,425,657 A | 2/1969 | Doyle |
| 3,611,864 A | 10/1971 | Buckley |

(Continued)

FOREIGN PATENT DOCUMENTS

WO  PCTUS195961  11/2019

OTHER PUBLICATIONS

"Company's 3D-printed replacement headlight tab kits verified by CAPA" (Repairer Driven News) Sep. 26, 2019; retrieved from internet Dec. 23, 2019.

(Continued)

*Primary Examiner* — Paul N Dickson
*Assistant Examiner* — Timothy Wilhelm
(74) *Attorney, Agent, or Firm* — Elevated IP, LLC

(57) ABSTRACT

Mounting tabs, kits and methods of using the mounting tabs where none previously existed or for replacing/repairing broken mounting tabs are disclosed. For example, the mounting tabs, kits and methods disclosed herein are well suited for the repair of high value components, including automotive components.

18 Claims, 37 Drawing Sheets

(56) References Cited

U.S. PATENT DOCUMENTS

| | | | |
|---|---|---|---|
| 4,193,621 A * | 3/1980 | Peichl | B60R 19/18 |
| | | | 293/142 |
| 4,243,196 A | 1/1981 | Toda et al. | |
| 4,270,328 A * | 6/1981 | Page | B60R 13/0206 |
| | | | 24/292 |
| 4,643,260 A | 2/1987 | Miller | |
| 4,742,435 A * | 5/1988 | Van Duyn | B60Q 1/0683 |
| | | | 362/289 |
| 4,751,619 A * | 6/1988 | Philippe | F16B 2/04 |
| | | | 362/306 |
| 4,947,306 A * | 8/1990 | O'Shaughnessey | |
| | | | B60Q 1/0683 |
| | | | 362/271 |
| 5,202,568 A * | 4/1993 | Woods | B60Q 1/0433 |
| | | | 250/223 R |
| 5,230,130 A * | 7/1993 | Bishop | B60Q 1/0064 |
| | | | 156/94 |
| 5,408,391 A * | 4/1995 | Denley | G01C 9/28 |
| | | | 33/288 |
| 5,454,543 A | 10/1995 | Carrico | |
| 5,566,057 A * | 10/1996 | Iwami | B60Q 1/0041 |
| | | | 362/549 |
| 5,597,980 A | 1/1997 | Weber | |
| 5,601,676 A | 2/1997 | Zimmerman et al. | |
| 5,612,516 A * | 3/1997 | Valitutti | B60R 11/0217 |
| | | | 181/141 |
| 6,101,087 A * | 8/2000 | Sutton | B60R 11/0252 |
| | | | 361/679.44 |
| 6,106,122 A | 8/2000 | Gilbert et al. | |
| 6,109,586 A * | 8/2000 | Hoek | B60R 1/076 |
| | | | 248/476 |
| 6,120,170 A * | 9/2000 | Hamelbeck | B60Q 1/26 |
| | | | 362/368 |
| 6,135,619 A * | 10/2000 | Donaire Camacho | |
| | | | B60Q 1/0433 |
| | | | 362/288 |
| 6,197,397 B1 | 3/2001 | Sher et al. | |
| 6,216,691 B1 * | 4/2001 | Kenyon | F04D 29/663 |
| | | | 128/205.18 |
| 6,239,928 B1 * | 5/2001 | Whitehead | B60R 1/078 |
| | | | 359/871 |
| 6,250,148 B1 * | 6/2001 | Lynam | B60R 1/04 |
| | | | 73/170.17 |
| 6,326,613 B1 * | 12/2001 | Heslin | B60S 1/0885 |
| | | | 250/239 |
| 6,336,671 B1 * | 1/2002 | Leonardi | B60R 5/04 |
| | | | 224/42.13 |
| 6,357,811 B1 * | 3/2002 | Nakamura | B60R 11/00 |
| | | | 296/29 |
| 6,471,386 B2 * | 10/2002 | Oh | B60Q 1/0433 |
| | | | 362/369 |
| 6,523,886 B2 * | 2/2003 | Hoffner | B60Q 1/0433 |
| | | | 296/203.02 |
| 6,554,461 B2 * | 4/2003 | Yamada | B60Q 1/0433 |
| | | | 362/368 |
| 6,637,900 B2 * | 10/2003 | Ohashi | B60R 1/06 |
| | | | 359/838 |
| 6,908,127 B2 * | 6/2005 | Evans | B60D 1/52 |
| | | | 293/109 |
| 6,916,100 B2 * | 7/2005 | Pavao | B60Q 1/2665 |
| | | | 359/841 |
| 7,014,257 B2 * | 3/2006 | Lazzeroni | B25B 27/0035 |
| | | | 296/193.09 |
| 7,083,207 B2 * | 8/2006 | Matsuzawa | B60R 19/24 |
| | | | 293/155 |
| 7,140,760 B2 * | 11/2006 | Kidd | B60Q 1/0064 |
| | | | 362/549 |
| 7,207,617 B2 * | 4/2007 | Pelini | B62D 25/08 |
| | | | 293/120 |
| 7,252,422 B2 * | 8/2007 | Kim | B60Q 1/0064 |
| | | | 362/368 |
| 7,419,206 B2 * | 9/2008 | Slobodecki | B60J 3/0217 |
| | | | 24/289 |
| 7,520,693 B2 * | 4/2009 | Werman | F16B 5/02 |
| | | | 403/408.1 |
| 7,540,550 B1 * | 6/2009 | Huber | B60R 19/24 |
| | | | 293/120 |
| 7,954,976 B1 * | 6/2011 | Berge | F21V 21/00 |
| | | | 362/148 |
| 7,975,350 B2 * | 7/2011 | Nagami | B60R 11/0235 |
| | | | 16/367 |
| 8,136,971 B2 * | 3/2012 | Hartman | B29C 73/02 |
| | | | 362/507 |
| 8,207,836 B2 * | 6/2012 | Nugent | G08G 1/165 |
| | | | 340/435 |
| 8,226,133 B2 * | 7/2012 | Sano | B60R 19/24 |
| | | | 293/155 |
| 8,256,821 B2 | 9/2012 | Lawlor et al. | |
| 8,302,717 B2 * | 11/2012 | Mizuta | B60Q 1/0408 |
| | | | 180/69.2 |
| 8,342,702 B2 * | 1/2013 | Ohe | B60R 1/06 |
| | | | 359/871 |
| 8,371,411 B2 * | 2/2013 | Kawaguchi | B62M 7/12 |
| | | | 180/220 |
| 8,414,069 B1 * | 4/2013 | Contardi | B60Q 1/045 |
| | | | 296/198 |
| 8,454,211 B2 * | 6/2013 | Todaka | B60Q 1/0433 |
| | | | 362/459 |
| 8,550,510 B2 * | 10/2013 | Mizoguchi | B60R 19/24 |
| | | | 293/126 |
| 8,567,853 B2 * | 10/2013 | Huber | B60R 19/24 |
| | | | 296/193.09 |
| 8,576,138 B2 | 11/2013 | Suzuki et al. | |
| 8,585,266 B2 * | 11/2013 | Kersting | B60Q 1/045 |
| | | | 362/523 |
| 8,720,975 B1 * | 5/2014 | Perez | B60R 21/34 |
| | | | 296/187.04 |
| 8,754,943 B2 * | 6/2014 | Klaerner | B60Q 1/0023 |
| | | | 348/148 |
| 8,814,394 B2 * | 8/2014 | Aquilina | B60Q 1/045 |
| | | | 362/368 |
| 8,820,449 B2 * | 9/2014 | Nakashima | B60K 17/043 |
| | | | 180/65.51 |
| 9,079,537 B2 * | 7/2015 | Niessen | B60R 1/006 |
| 9,090,213 B2 | 7/2015 | Lawlor et al. | |
| 9,126,291 B1 * | 9/2015 | Thrasher | B23P 6/00 |
| 9,156,418 B2 * | 10/2015 | Ramoutar | B60R 19/24 |
| 9,156,419 B2 * | 10/2015 | Yotsunaga | B60R 19/24 |
| 9,169,966 B2 | 10/2015 | Schaffer et al. | |
| 9,221,387 B1 | 12/2015 | Thorpe et al. | |
| 9,340,158 B2 | 5/2016 | Nishimura et al. | |
| 9,365,245 B2 * | 6/2016 | Donabedian | B62D 25/04 |
| 9,371,094 B1 | 6/2016 | Ferauche et al. | |
| 9,422,007 B2 * | 8/2016 | Suzuki | B62D 21/155 |
| 9,428,112 B2 * | 8/2016 | Eto | B60R 1/006 |
| 9,463,834 B2 * | 10/2016 | Brueckner | B62D 25/085 |
| 9,539,934 B2 * | 1/2017 | Fortin | E02F 3/963 |
| 9,596,387 B2 | 3/2017 | Achenbach et al. | |
| 9,623,801 B2 * | 4/2017 | Jeon | B60R 1/04 |
| 9,669,762 B2 * | 6/2017 | Pearson | B60R 1/006 |
| 9,695,975 B2 * | 7/2017 | Ogawa | B60R 7/08 |
| 9,773,601 B2 * | 9/2017 | Breiwa | F16M 13/02 |
| 9,850,936 B2 | 12/2017 | Tanabe | |
| 9,908,483 B2 * | 3/2018 | Horneck | B60R 13/0206 |
| 9,944,219 B2 * | 4/2018 | Lakatos | B60Q 1/0483 |
| 10,093,272 B1 * | 10/2018 | Shen | B60R 19/023 |
| 10,148,004 B2 * | 12/2018 | Taira | H01Q 1/3275 |
| 10,315,596 B2 * | 6/2019 | Kuji | B60R 19/24 |
| 10,369,945 B2 * | 8/2019 | Gruebl | B60R 19/24 |
| 10,518,714 B2 * | 12/2019 | Masanek, Jr. | B60R 7/02 |
| 10,549,706 B2 | 2/2020 | Syed et al. | |
| 10,648,635 B1 * | 5/2020 | Ford | F21S 41/148 |
| 2003/0097728 A1 | 5/2003 | Tisol et al. | |
| 2003/0098908 A1 * | 5/2003 | Misaiji | B60R 1/12 |
| | | | 348/148 |
| 2005/0074276 A1 * | 4/2005 | Luetze | B62D 27/065 |
| | | | 403/14 |
| 2005/0083596 A1 | 4/2005 | Jang | |

(56) References Cited

U.S. PATENT DOCUMENTS

| | | | |
|---|---|---|---|
| 2006/0255082 A1* | 11/2006 | Tsai | B60P 7/0807 224/403 |
| 2007/0256776 A1 | 11/2007 | Keicher | |
| 2010/0128458 A1* | 5/2010 | Nagami | B60R 11/0235 361/825 |
| 2011/0318091 A1* | 12/2011 | Costabel | B64C 1/066 403/33 |
| 2012/0013741 A1* | 1/2012 | Blake, III | B60S 1/0881 348/148 |
| 2012/0074283 A1* | 3/2012 | Tanno | F16B 5/126 248/231.81 |
| 2012/0076680 A1 | 3/2012 | Bahmata et al. | |
| 2012/0086237 A1* | 4/2012 | Raulf | B62D 25/085 296/193.09 |
| 2012/0106181 A1 | 5/2012 | DeRouin et al. | |
| 2012/0235009 A1* | 9/2012 | Horie | B60R 1/06 248/475.1 |
| 2012/0294027 A1* | 11/2012 | Merriman | B60Q 1/2665 362/519 |
| 2014/0084609 A1* | 3/2014 | Momii | B60R 19/24 293/155 |
| 2014/0169020 A1* | 6/2014 | Aquilina | B60Q 1/0491 362/523 |
| 2014/0177258 A1* | 6/2014 | Gebhard | B60R 11/00 362/547 |
| 2014/0204218 A1* | 7/2014 | Gebhard | B60R 11/04 348/164 |
| 2015/0021942 A1 | 1/2015 | Evans | |
| 2015/0047167 A1* | 2/2015 | Gonzalez, III | B60Q 1/0433 29/402.08 |
| 2015/0102616 A1* | 4/2015 | Yotsunaga | B60R 19/24 293/155 |
| 2015/0231950 A1* | 8/2015 | Bender | B60J 1/20 403/288 |
| 2015/0251605 A1* | 9/2015 | Uken | B60R 1/12 248/467 |
| 2015/0291114 A1* | 10/2015 | Borde | B60R 19/30 293/122 |
| 2016/0009230 A1* | 1/2016 | Miyado | B60R 11/00 224/482 |
| 2016/0039157 A1 | 2/2016 | Huang et al. | |
| 2016/0121585 A1 | 5/2016 | Jennings et al. | |
| 2016/0121836 A1* | 5/2016 | Yamamoto | B60R 21/213 280/728.2 |
| 2016/0215963 A1 | 7/2016 | Dubosc et al. | |
| 2017/0113632 A1* | 4/2017 | Dickinson | F16B 2/24 |
| 2017/0136938 A1 | 5/2017 | Lakatos et al. | |
| 2017/0182950 A1* | 6/2017 | Miyazaki | H05K 7/12 |
| 2017/0305334 A1 | 10/2017 | Vincent et al. | |
| 2017/0368770 A1 | 12/2017 | Harrier et al. | |
| 2018/0009365 A1 | 1/2018 | Rubia et al. | |
| 2018/0065571 A1* | 3/2018 | Hart | H04N 5/2251 |
| 2018/0070178 A1* | 3/2018 | Tabbert | B60R 11/0217 |
| 2018/0100535 A1* | 4/2018 | Tashiro | B60R 11/00 |
| 2018/0170282 A1* | 6/2018 | Lee | B60R 13/0275 |
| 2018/0170437 A1* | 6/2018 | Park | B60R 19/24 |
| 2018/0180083 A1* | 6/2018 | Marco | F16B 21/186 |
| 2018/0195834 A1* | 7/2018 | Tedder | B60R 7/14 |
| 2018/0244225 A1 | 8/2018 | Nakayama | |
| 2018/0244227 A1* | 8/2018 | Miller | B60R 19/24 |
| 2018/0297507 A1* | 10/2018 | Patak | B33Y 10/00 |
| 2018/0297538 A1* | 10/2018 | Koulas | G01D 11/30 |
| 2018/0304544 A1* | 10/2018 | Ii | B29C 66/73921 |
| 2018/0340317 A1* | 11/2018 | Voetter | E03C 1/021 |
| 2019/0077297 A1* | 3/2019 | Kueppers | B60Q 1/0005 |
| 2019/0126850 A1* | 5/2019 | Hallack | G03B 17/561 |
| 2019/0256010 A1* | 8/2019 | Baba | H04R 1/02 |
| 2019/0270422 A1* | 9/2019 | Isomura | B60R 19/023 |
| 2019/0275953 A1* | 9/2019 | Mori | B60R 16/0239 |
| 2019/0291632 A1 | 9/2019 | Paperi | |
| 2019/0308566 A1* | 10/2019 | Blom | B60R 22/18 |
| 2019/0322223 A1* | 10/2019 | Hancock | F16B 2/08 |
| 2019/0322232 A1* | 10/2019 | Yagame | B60R 19/24 |
| 2019/0339593 A1* | 11/2019 | Mayville | F16C 11/10 |
| 2019/0344728 A1* | 11/2019 | Vargas Linan | F16B 1/00 |
| 2019/0366963 A1* | 12/2019 | Kumashiro | H05K 9/002 |
| 2019/0369664 A1* | 12/2019 | Peters | F16B 47/006 |
| 2019/0381948 A1* | 12/2019 | Portuallo | B60R 1/12 |

OTHER PUBLICATIONS

International Search Report and Written Opinion for PCT/US19/59614 dated Jan. 24, 2020.

Matt Grasson, New Lightweight Honeycomb Structure, Aerospace Manufacturing and Design, Apr. 13, 2010.

Stefan Menin, Working with Dimensional Tolerances, Machine Design, May 10, 2012.

U.S. Appl. No. 62/647,787, filed Mar. 25, 2018, Maurice Paperi.

Thermoplastics v. Thermoset, Jan. 15, 2016, Star Thermoplastics (Year: 2016).

* cited by examiner

UNIVERSAL MOUNTING TABS AND KITS FOR AUTOMOTIVE COMPONENTS

CROSS-REFERENCE TO RELATED APPLICATIONS

This application claims the benefit of and priority to U.S. Provisional Patent Application No. 62/647,787, filed Mar. 25, 2018, which is hereby incorporated by reference in its entirety.

BACKGROUND

Automotive components are frequently damaged in accidents. However, the prevalence of plastic parts in the automotive industry means that breakage of a single, integrated plastic mounting bracket is typically all that is needed to prevent an entire high value component from being salvaged. Thus, many automotive repairs are unnecessarily expensive.

SUMMARY

The present invention provides mounting tabs for automotive components, kits comprising mounting tabs for automotive components and instructions, methods for providing mounting tabs on automotive components where none previously existed, and methods for replacing or repairing broken mounting tabs. For example, the mounting tabs, kits and methods disclosed herein are well suited for the repair of high value components, including vehicle components for automobiles, aircraft, watercraft, and human-powered vehicles (bicycles, kayaks, canoes, etc.). The mounting tabs disclosed herein partially or completely cover and conceal a portion of a damaged automotive component. In embodiments, vehicle head light/tail light casings; interior light casings; dashboards; glove boxes; compartment hatches; aesthetically wrapped components, such as steering wheels, shift knobs and sun visors; sensor modules and other fastening features of cockpit and body components, may be repaired by the tabs, kits and methods disclosed.

In an aspect, a mounting tab for an automotive component comprises a cover for receiving a portion of the automotive component and a mounting feature extending from the cover or disposed within an external wall of the cover.

In an embodiment, the external surface and/or the internal surface of the cover has a form factor that is substantially rectangular, substantially square, substantially cylindrical, or substantially pyramidal.

In an embodiment, the external surface and/or the internal surface of the cover comprises a complex form factor conforming to a complex shape of the portion of the automotive component.

In an aspect, a mounting tab for an automotive component comprises a cover for receiving a portion of the automotive component, wherein the cover comprises a complex form factor conforming to a complex shape of the portion of the automotive component, and a mounting feature extending from the cover or disposed within an external wall of the cover.

In an embodiment, the cover comprises a first piece and a second piece for sandwiching a portion of an automotive component, wherein the first piece is securable solely to the portion of the automotive component and the second piece is securable solely to the first piece or wherein the first piece, the second piece and the portion of the automotive component form a sandwiched stack securable via a hole penetrating through the sandwiched stack.

In an embodiment, a portion of the automotive component that the mounting tab is secured to comprises at least one boss. In an embodiment, the first piece has at least one hole configured to align with a boss of the portion of the automotive component when the first piece and the portion are mated. In an embodiment, the second piece has at least one hole configured to align with a boss of the first piece when the first piece and the second piece are mated.

In an embodiment, the first piece and the second piece are hinged together.

In an embodiment, the first piece and the second piece are complimentary male and female pieces.

In an embodiment, a cover comprises at least three external walls oriented substantially perpendicular to a plane. In an embodiment, a cover comprises at least four walls oriented substantially perpendicular to a plane. In an embodiment, a cover comprising three or four walls forms a pocket or cavity.

In an embodiment, a cover comprises at least one securement extension for receiving means for fixing the cover to the automotive component. In an embodiment, a mounting tab or cover comprises at least one securement extension configured to at least partially wrap at least two surfaces of the automotive component. In an embodiment, the securement extension forms a substantially linear slot. In an embodiment, the substantially linear slot is open at one end or both ends. In an embodiment, the securement extension comprises a plurality of mounting holes.

In an embodiment, an external wall of the cover abuts a wall of the automotive component in an end-to-end configuration, thereby forming a substantially planar contiguous surface.

In an embodiment, the mounting feature comprises a bolt hole. In an embodiment, the bolt hole is a slotted bolt hole.

In an embodiment, the mounting feature comprises one or more structural braces.

In an embodiment, a mounting tab comprises a material selected from the group consisting of a thermoplastic, a photopolymer resin, an elastomer, a metal, a metal alloy and combinations thereof. In an embodiment, a mounting tab material comprises a filler, such as powdered glass, a powdered mineral or a combination thereof.

In an embodiment, an automotive component is selected from the group consisting of a vehicle head light casing, a vehicle tail light casing, an interior light casing, a dashboard, a glove box, a compartment hatch, a steering wheel, a shift knob, a sensor module and a sun visor.

In an aspect, a kit for providing a tab of an automotive component comprises a cover for receiving a portion of an automotive component having a mounting feature extending from the cover or disposed within an external wall of the cover and instructions for securing the cover to the automotive component.

In an aspect, a method of applying a mounting tab to an automotive component comprises mating the mounting tab with the automotive component and securing the mounting tab to the automotive component. In an embodiment, a method of applying a mounting tab to an automotive component further comprises removing an uneven, broken portion of an original mounting tab. For example, the step of removing an uneven portion of an original mounting tab may include cutting, and optionally sanding, the uneven portion to create a straight edge.

In an embodiment, the step of securing comprises mechanical fastening. In an embodiment, the step of securing comprises screwing, riveting, gluing, cementing, welding, epoxying and combinations thereof. For example, a two-part epoxy, screws with locking nuts, screws secured with adhesives, glue (with or without an adhesion promoter), nitrogen welding, sonic welding, iron welding, or other means of fixing and securing a mounting tab to an automotive component may be used.

In an embodiment, a mounting tab disclosed herein may further comprise one or more protrusions for contacting the automotive component. The purpose of the one or more protrusions is to provide proper alignment of the mounting tab with at least a portion of the automotive component and/or to set a predetermined distance or spacing between the automotive component and the mounting tab.

In an embodiment, the portion of the automotive component contacting a protrusion of a mounting tab is a relief feature of an automotive component. In an embodiment, the portion of the automotive component contacting a protrusion of a mounting tab is a relief feature of an automotive component, the relief feature having a complex shape.

In an embodiment, the portion of the automotive component contacting a protrusion of a mounting tab is a broken portion of an automotive component that is integral with the automotive component. In an embodiment, the portion of the automotive component contacting a protrusion of a mounting tab is a broken portion of an original mounting tab that remains attached to the automotive component.

Mounting tabs disclosed herein may be manufactured by techniques known in the art, including, but not limited to, laser cutting and printing, CNC machining, additive manufacturing, injection molding, casting and combinations thereof. In an embodiment, additive manufacturing may utilize a powder, a filament, a bonding agent or combinations thereof.

In an embodiment, an internal surface of a cover traces a complex external surface of an automotive component with a tolerance of +/−0.25 mm, holes are positioned within +/−0.25 mm of the true position, and the thickness of the cover wall is approximately 2.5 mm. In an embodiment, a mounting feature is sized, positioned and shaped to match the specifications of an original OEM mounting feature.

In an embodiment, a mounting tab may be customized to mate with a portion of an automotive component by performing a 3D scan on the portion of the automotive component. Based on the 3D scan, a mounting tab cover, such as an internal surface of a cover, can be configured to match the complex surface shape of the automotive component.

In an embodiment, mounting tabs disclosed herein have a tensile strength selected from the range of 20 MPa to 500 MPa, or 30 MPa to 250 MPa, or 40 MPa to 100 MPa, or 45 MPa to 75 MPa. In an embodiment, mounting tabs disclosed herein have a tensile modulus selected from the range of 1000 MPa to 5000 MPa, or 1200 MPa to 2500 MPa, or 1400 MPa to 2000 MPa, or 1600 MPa to 1800 MPa. In an embodiment, mounting tabs disclosed herein have an elongation at break selected from the range of 10% to 30%, or 12% to 25%, or 15% to 20%. In an embodiment, mounting tabs disclosed herein have a heat deflection temperature selected from the range of 75° C. to 275° C., or 85° C. to 200° C., or 90° C. to 175° C.

BRIEF DESCRIPTION OF THE DRAWINGS

Illustrative embodiments of the present invention are described in detail below with reference to the attached drawings, wherein.

DETAILED DESCRIPTION

Figure 1A:
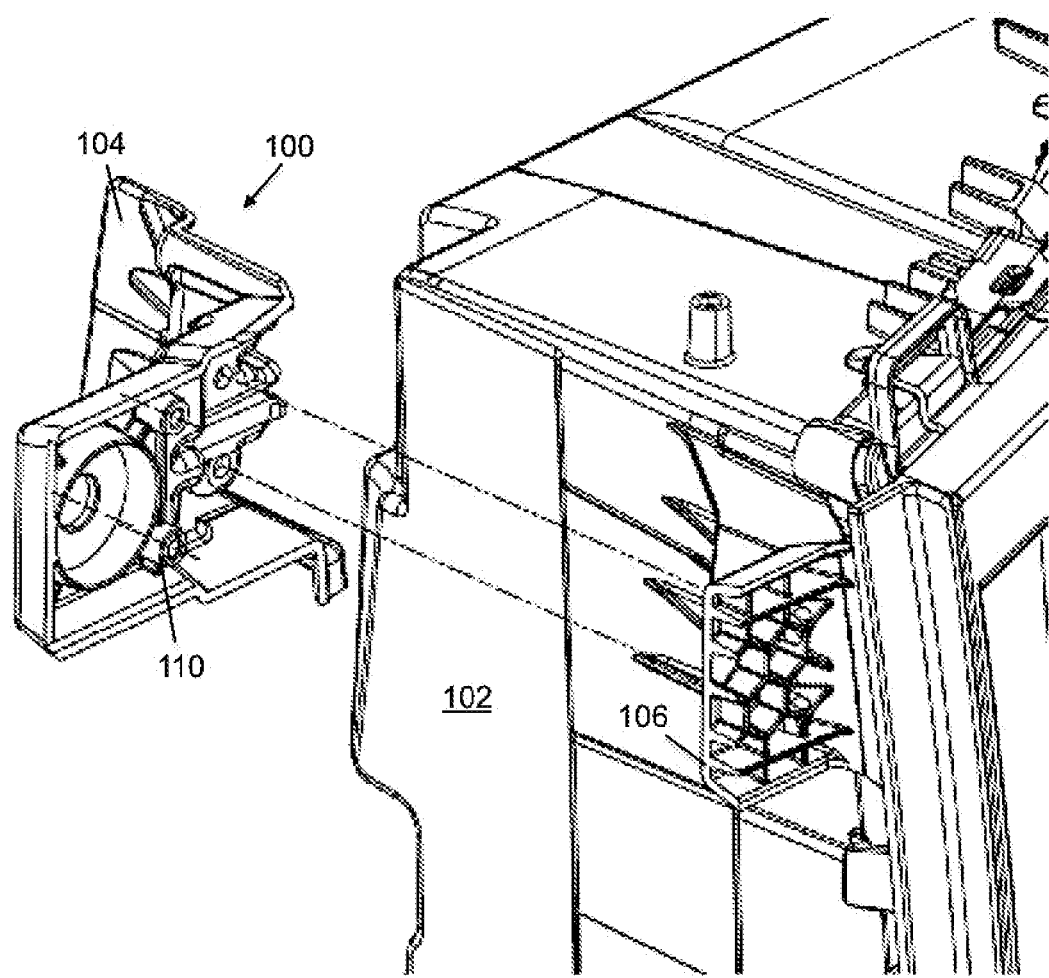
FIGS. 1A, 1B, 1C, 1D, 1E, 1F, 1G and 1H show a mounting tab for sandwiching a portion of an automotive component, according to an embodiment.

In general, the terms and phrases used herein have their art-recognized meaning, which can be found by reference to standard texts, journal references and contexts known to those skilled in the art. The following definitions are provided to clarify their specific use in the context of this description.

As used herein, "mounting tab" and "mounting bracket" may be used interchangeably to refer to a portion of an object configured for receiving means for securing the object to another object. Generally, a mounting tab extends or protrudes from a main body of the object such that, in many embodiments, the mounting tab forms an outermost boundary of the object.

As used herein, the term "cover" refers to a portion of a mounting tab configured to partially or completely encapsulate a broken portion of a mounting tab that was originally part of an OEM automotive component.

As used herein, the term "automotive components" includes components for automobiles, aircraft, watercraft, and human-powered vehicles (bicycles, kayaks, canoes, etc.).

The terms "direct and indirect" describe the actions or physical positions of one component relative to another component. For example, a component that "directly" acts upon or touches another component does so without intervention from an intermediary. Contrarily, a component that "indirectly" acts upon or touches another component does so through an intermediary (e.g., a third component).

"Polymer" refers to a macromolecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states. Crosslinked polymers having linked monomer chains are particularly useful for some applications. Polymers useable in the methods, devices and components include, but are not limited to, plastics, elastomers, thermoplastic elastomers, elastoplastics, thermoplastics and acrylates. Exemplary polymers include, but are not limited to, acetal polymers, biodegradable polymers, cellulosic polymers, fluoropolymers, nylons, polyacrylonitrile polymers, polyamide-imide polymers, polyimides, polyarylates, polybenzimidazole, polybutylene, polycarbonate, polyesters, polyetherimide, polyethylene, polyethylene copolymers and modified polyethylenes, polyketones, poly(methyl methacrylate), polymethylpentene, polyphenylene oxides and polyphenylene sulfides, polyphthalamide, polypropylene, polyethylene terephthalate, polyurethanes, styrenic resins, sulfone-based resins, vinyl-based resins, rubber (including natural rubber, styrene-butadiene, polybutadiene, neoprene, ethylene-propylene, butyl, nitrile, silicones), acrylic, nylon, polycarbonate, polyester, polyethylene, polypropylene, polystyrene, polyvinyl chloride, polyolefin or any combinations of these.

"Elastomer" refers to a polymeric material that can be stretched or deformed and returned to its original shape without substantial permanent deformation. Elastomers commonly undergo substantially elastic deformations. Useful elastomers include those comprising polymers, copolymers, composite materials or mixtures of polymers and copolymers. Exemplary elastomers include, but are not limited to silicon containing polymers such as polysiloxanes including poly(dimethyl siloxane) (i.e. PDMS and h-PDMS), poly(methyl siloxane), partially alkylated poly (methyl siloxane), poly(alkyl methyl siloxane) and poly (phenyl methyl siloxane), silicon modified elastomers, thermoplastic elastomers, styrenic materials, olefinic materials, polyolefin, polyurethane thermoplastic elastomers, polyamides, synthetic rubbers, polyisobutylene, poly(styrene-butadiene-styrene), polyurethanes, polychloroprene and silicones.

The term "additive manufacturing" refers to manufacturing processes that may be used to produce functional, three-dimensional, complex objects, layer-by-layer, without molds or dies.

Exemplary mounting tabs can be seen in FIGS. 1-13, which are described hereafter.

Figure 1B:
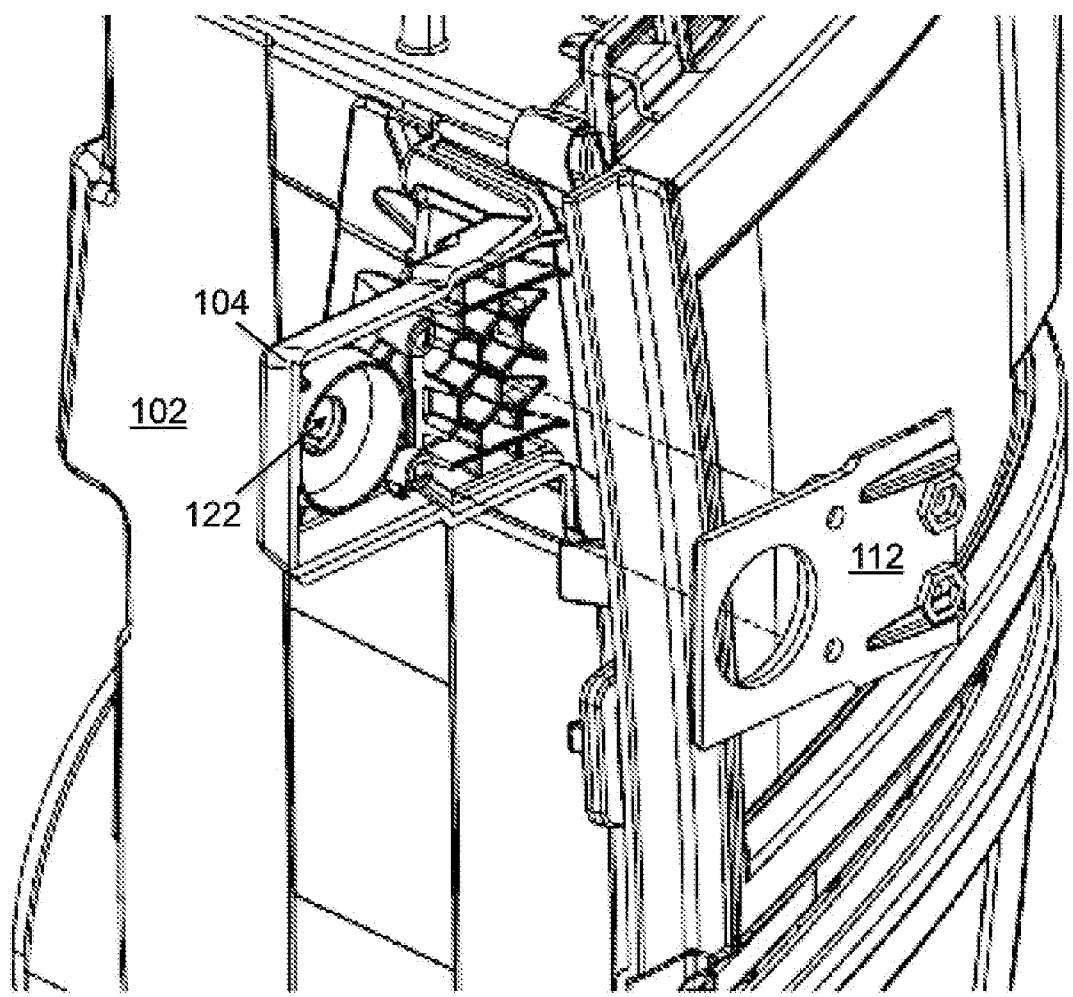
Figure 1C:
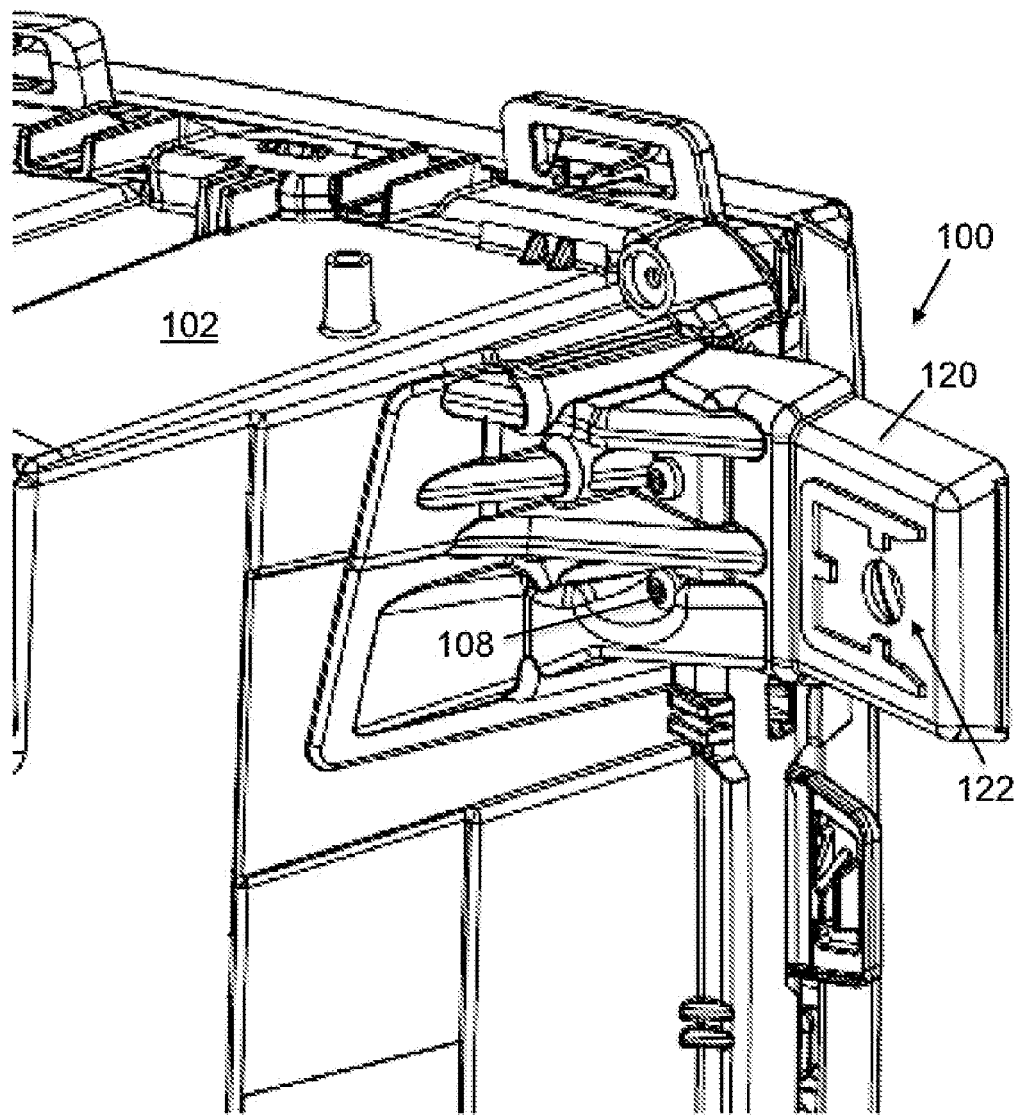
Figure 1D:
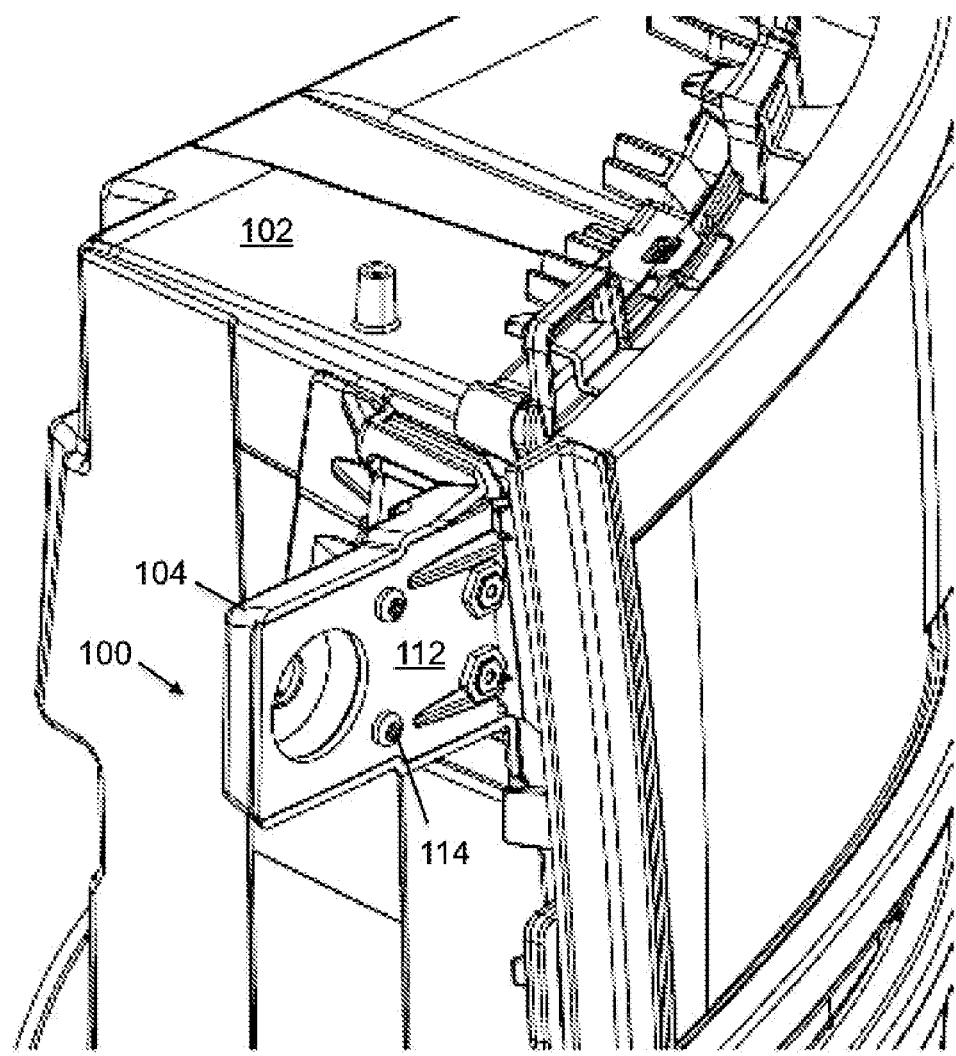

FIGS. 1A-1H show a mounting tab 100 for sandwiching a portion of an automotive component 102, such as a headlamp assembly, according to an embodiment. In FIG. 1A, a first piece 104 of mounting tab 100 is aligned with the back of a broken mounting tab 106 on the headlamp assembly. In FIG. 1B, first piece 104 is mated with the broken portion 106 of automotive component 102 and secured to the broken portion 106 by screws 108 passing through holes in first piece 104 into a pair of bosses of the broken portion 106. FIG. 1C shows screws 108 and the complex form factor of first piece 104, which traces the complex shape of the broken portion 106. Also in FIG. 1B, a second piece 112 of mounting tab 100 is aligned with a front of the broken portion 106, such that first piece 104 and second piece 112 sandwich and cover the broken portion 106. In FIG. 1D, second piece 112 is secured to first piece 104 by a pair of screws 114 passing through holes in second piece 112 into bosses 110 of first piece 104. Mounting tab 100 includes a mounting feature 120 to replace the mounting feature of the original mounting tab. As shown, mounting feature 120 comprises a bolt hole 122.

Figure 1E:
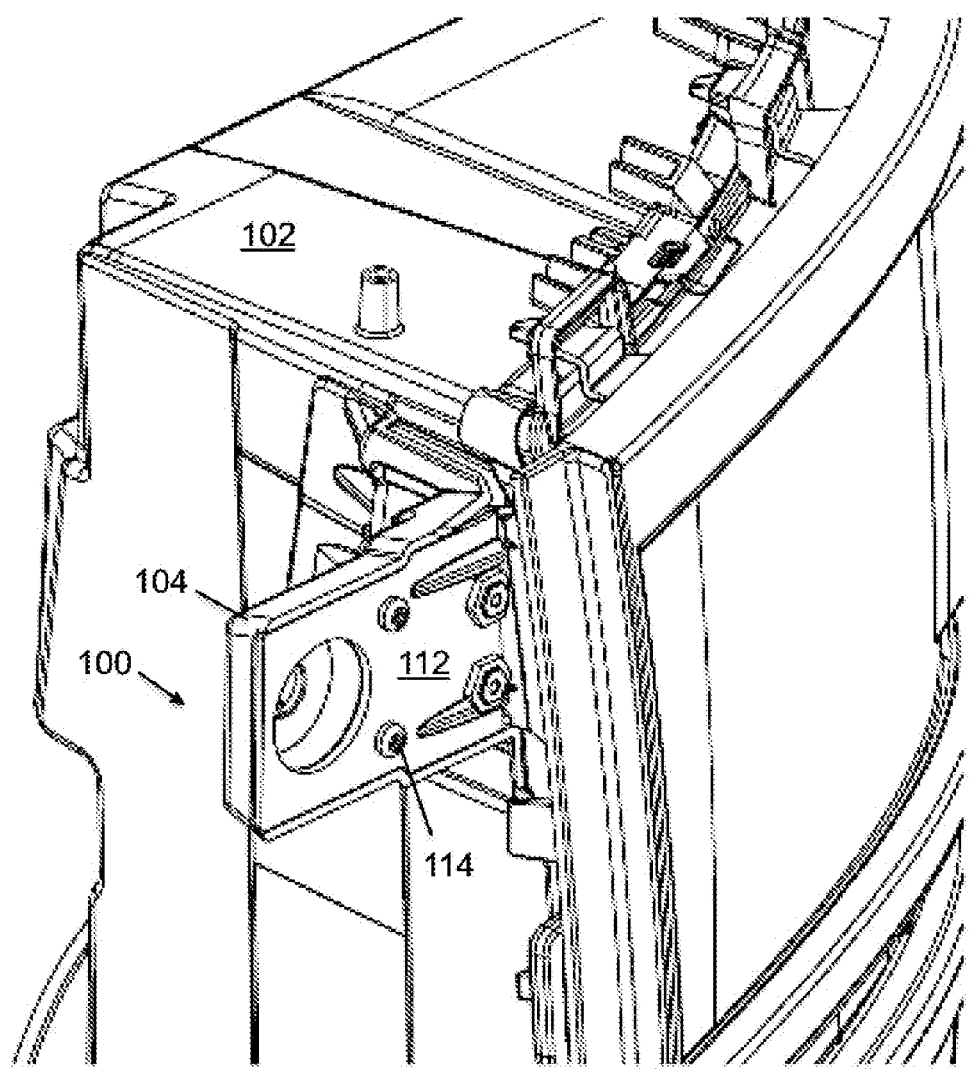
Figure 1F:
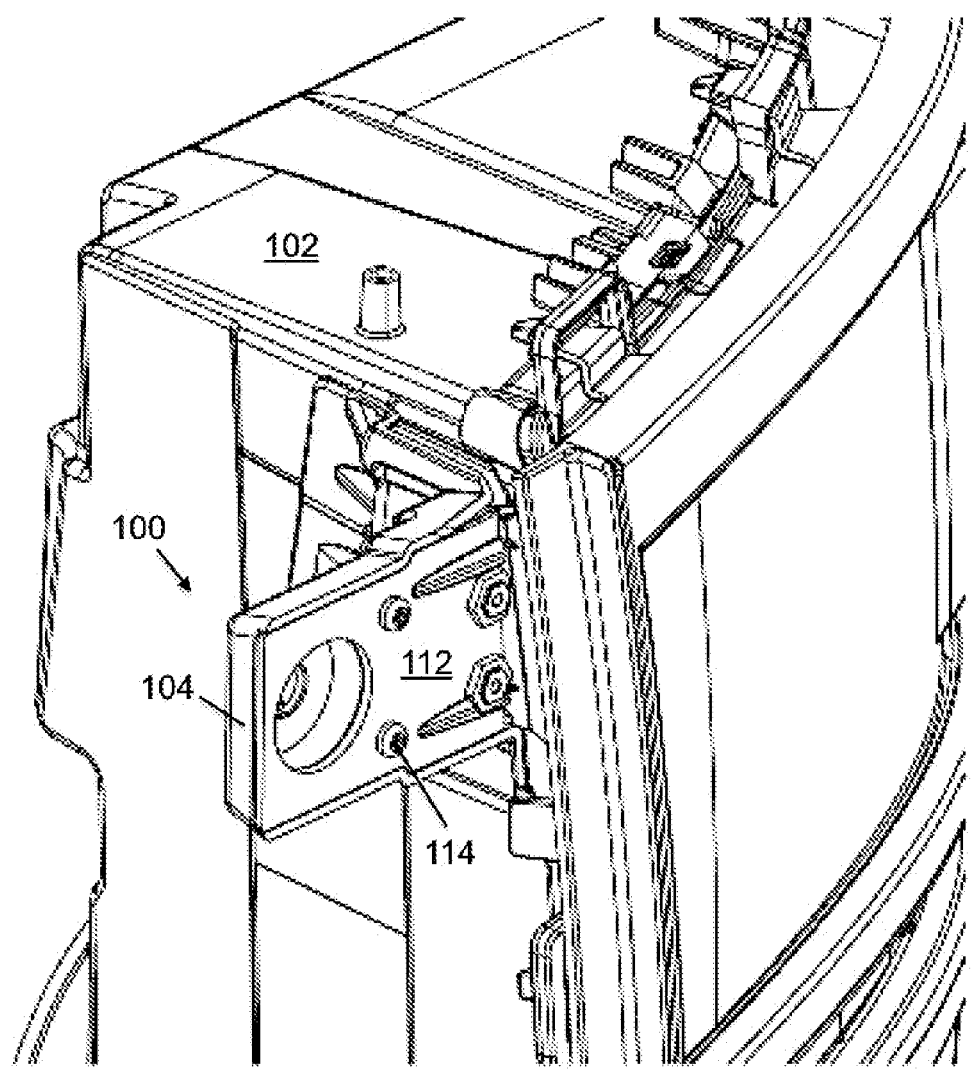
Figure 1G:
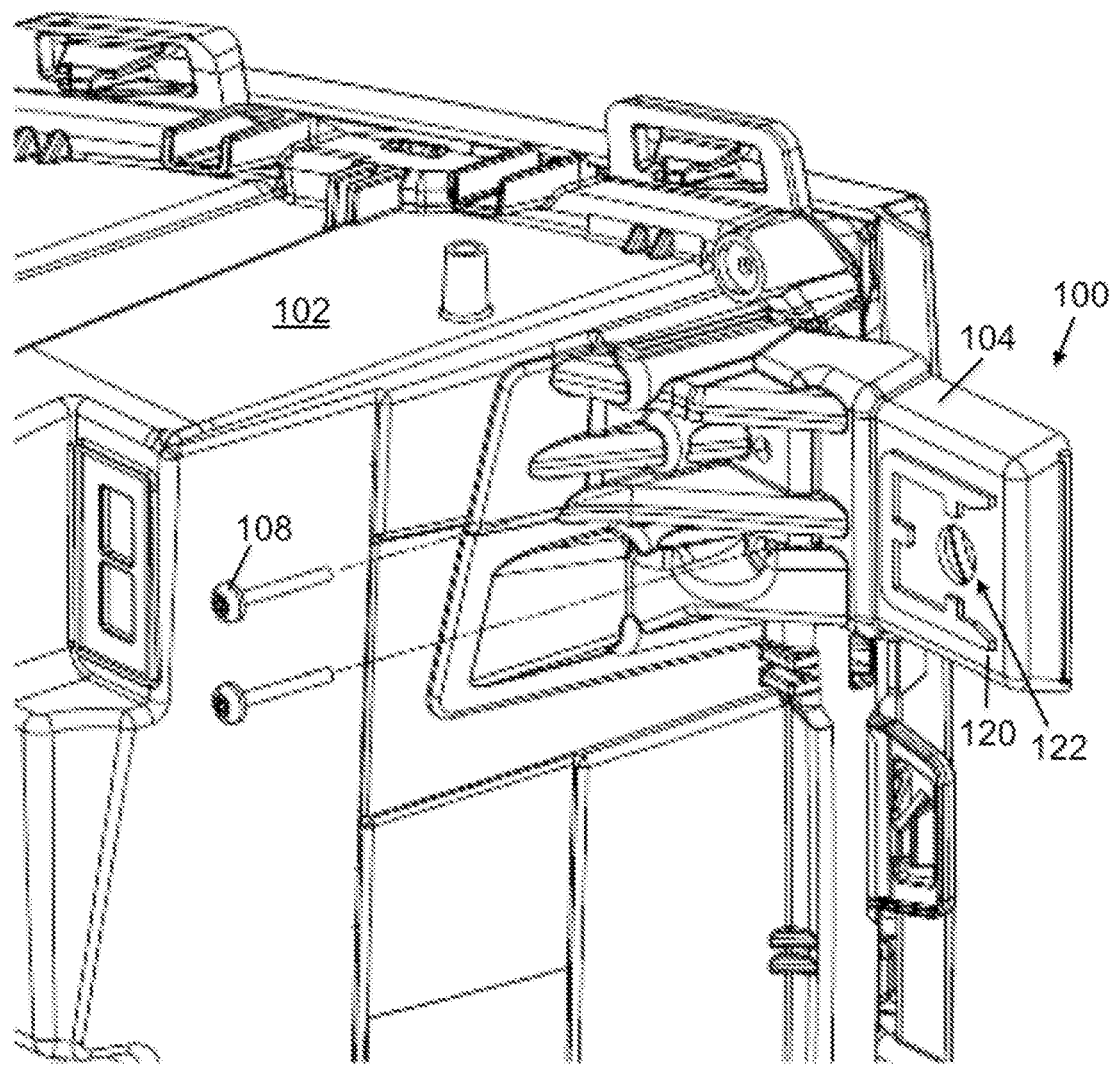
Figure 1H:
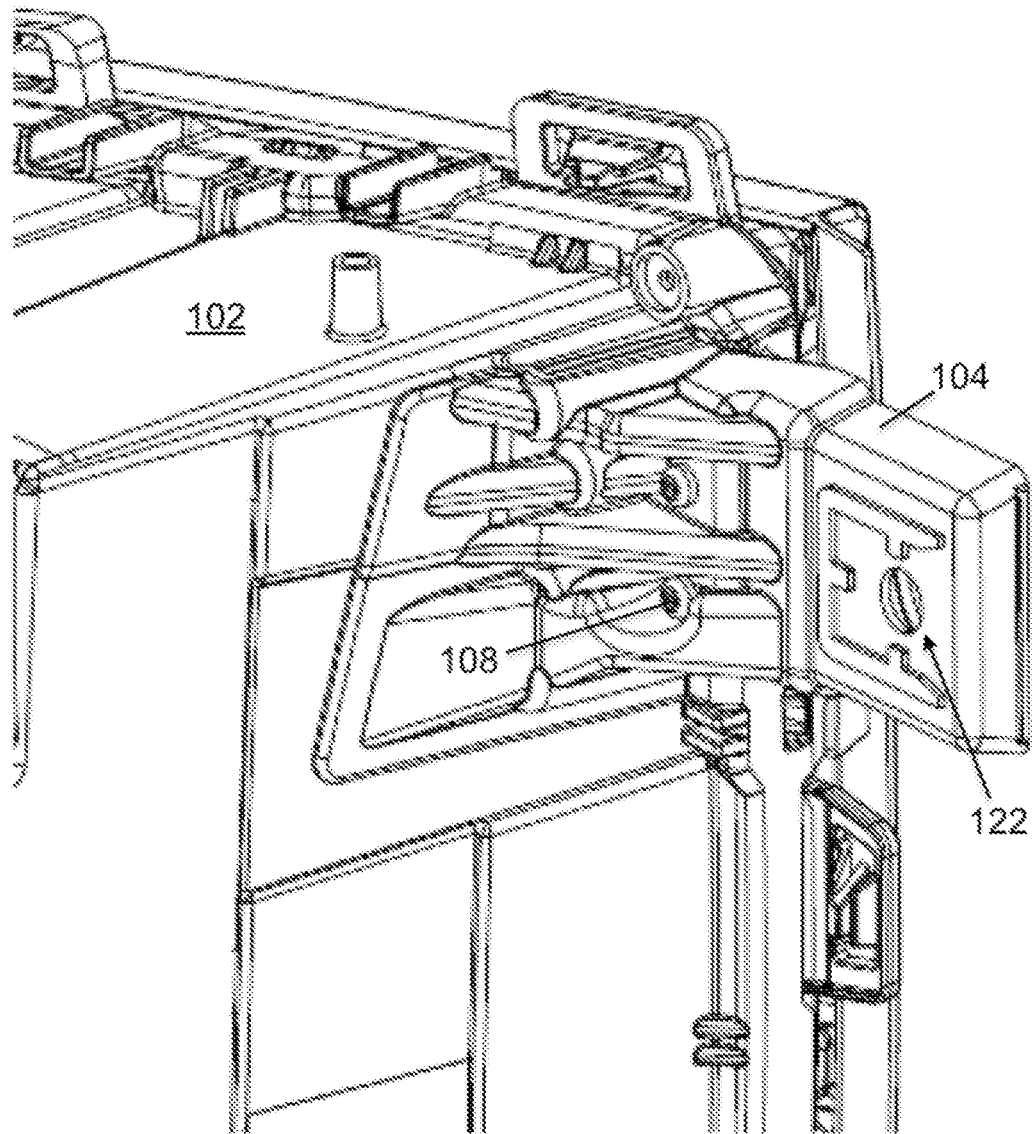

FIGS. 1E and 1F show front perspective views and FIGS. 1G and 1H show back perspective views of a sandwich-style mounting tab, where first piece 104, second piece 112 and the broken portion form a sandwiched stack securable via a hole penetrating through the entire sandwiched stack. Nuts and bolts are used to secure the sandwiched stack either through an existing boss or pair of bosses or through a drilled hole. Again, mounting tab 100 includes mounting feature 120 to replace the mounting feature of the original mounting tab.

Figure 2A:
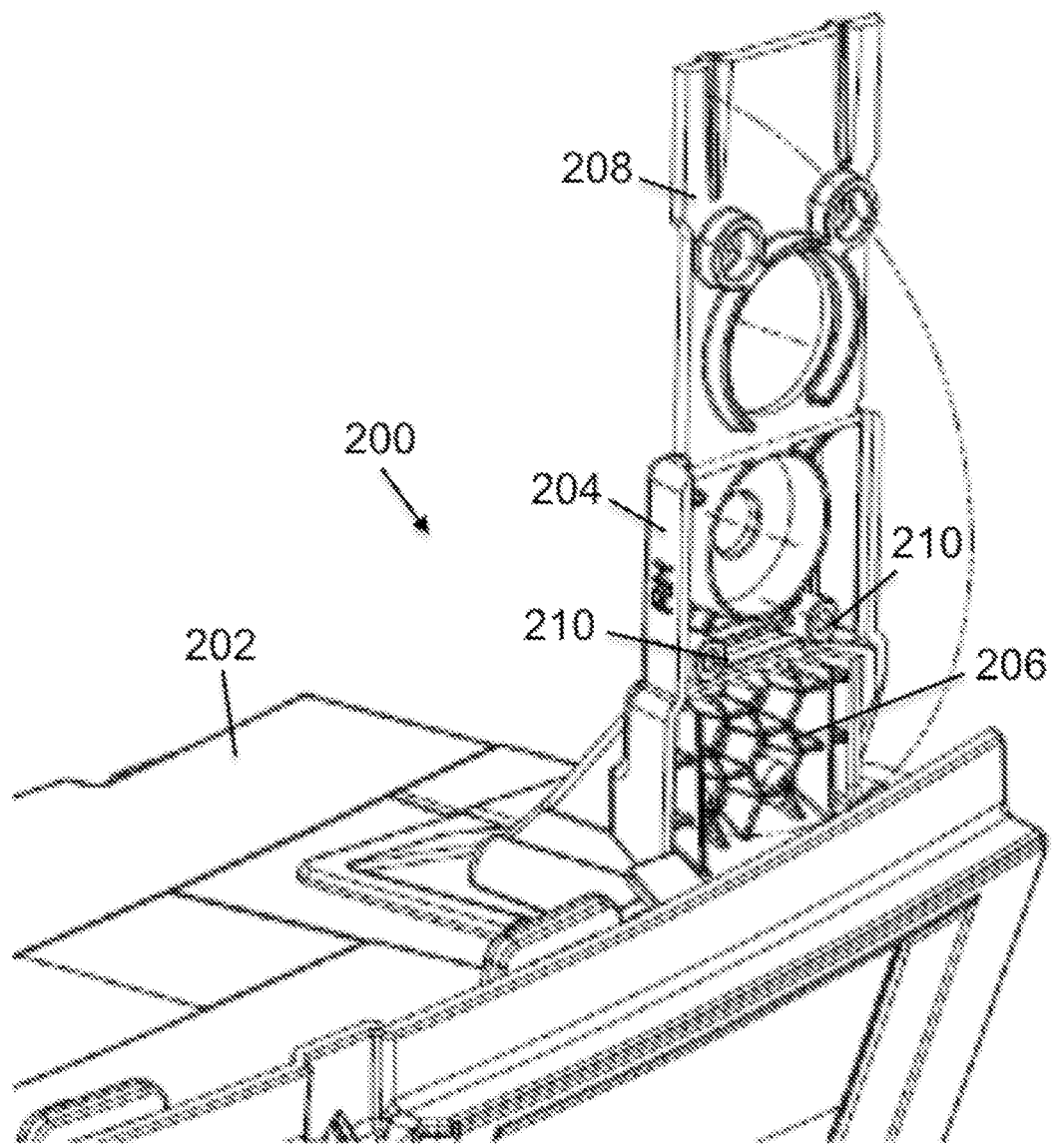
FIGS. 2A, 2B and 2C show a hinged version of a mounting tab for sandwiching a portion of an automotive component, according to an embodiment.
Figure 2B:
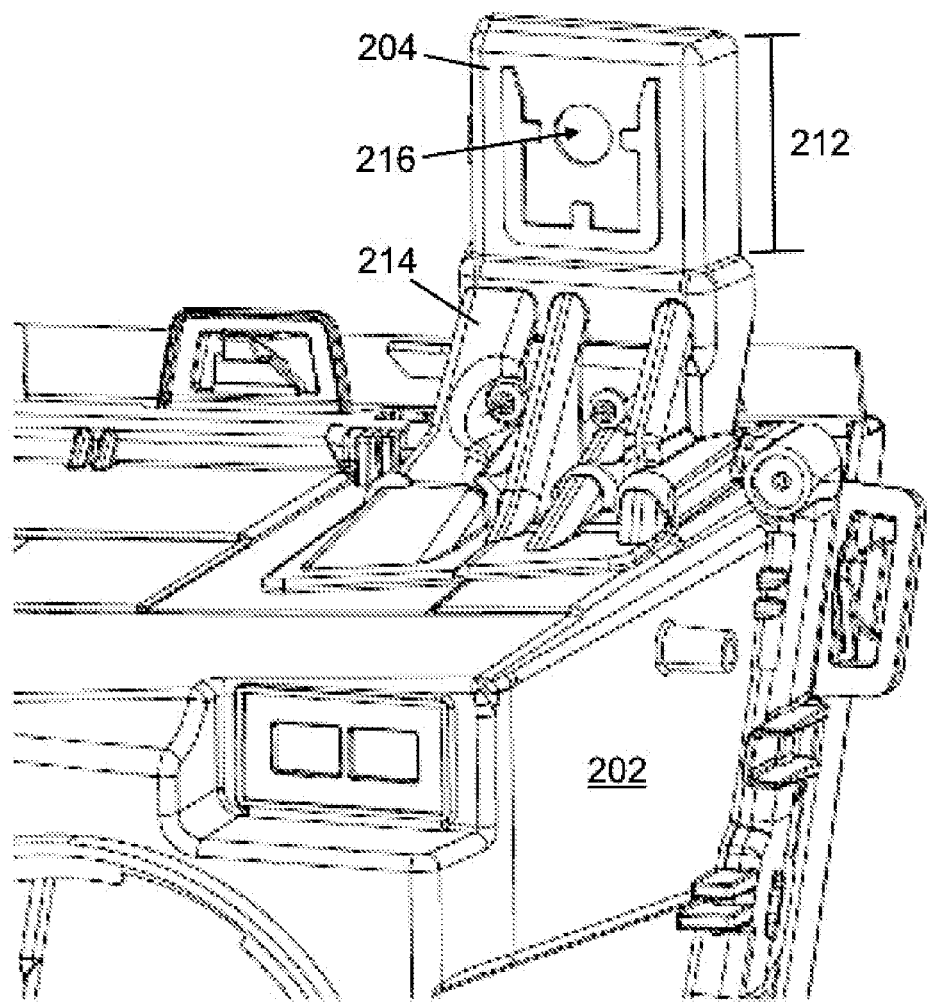
Figure 2C:
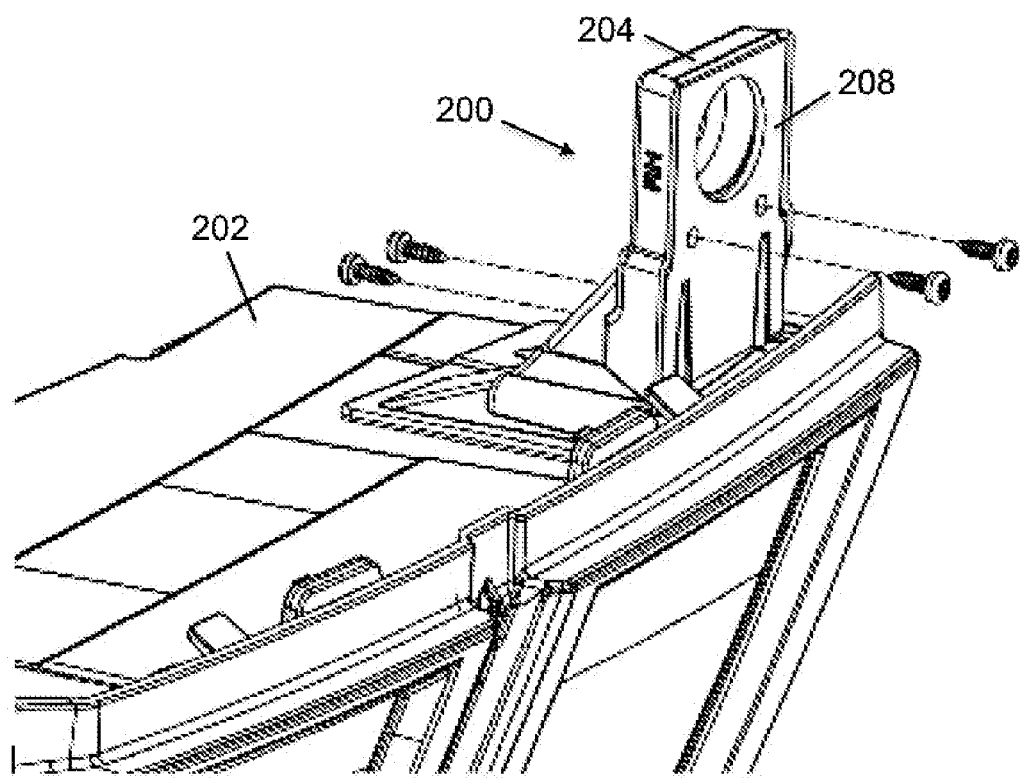

FIGS. 2A, 2B and 2C show a hinged version of a mounting tab 200 for sandwiching a portion of an automotive component 202, according to an embodiment. FIG. 2A shows a first piece 204 of mounting tab 200 mated with a broken portion 206 of an original mounting tab, and a second piece 208 raised above first piece 204 on a hinge. As shown in FIG. 2B, first piece 204 is secured to broken portion 206 with a pair of screws. Once second piece 208 is lowered to cover the broken piece, it is secured to first piece 204 by a pair of screws joining with bosses 210 of first piece 204. It is also contemplated that a hinged mounting tab for sandwiching a portion of an automotive component can form a sandwiched stack securable via a hole penetrating through the entire sandwiched stack. For example, one or more holes could be drilled through the sandwiched stack. As shown, a mounting feature 212 extends from cover 214. Mounting feature 212 comprises a bolt hole 216.

Figure 3:
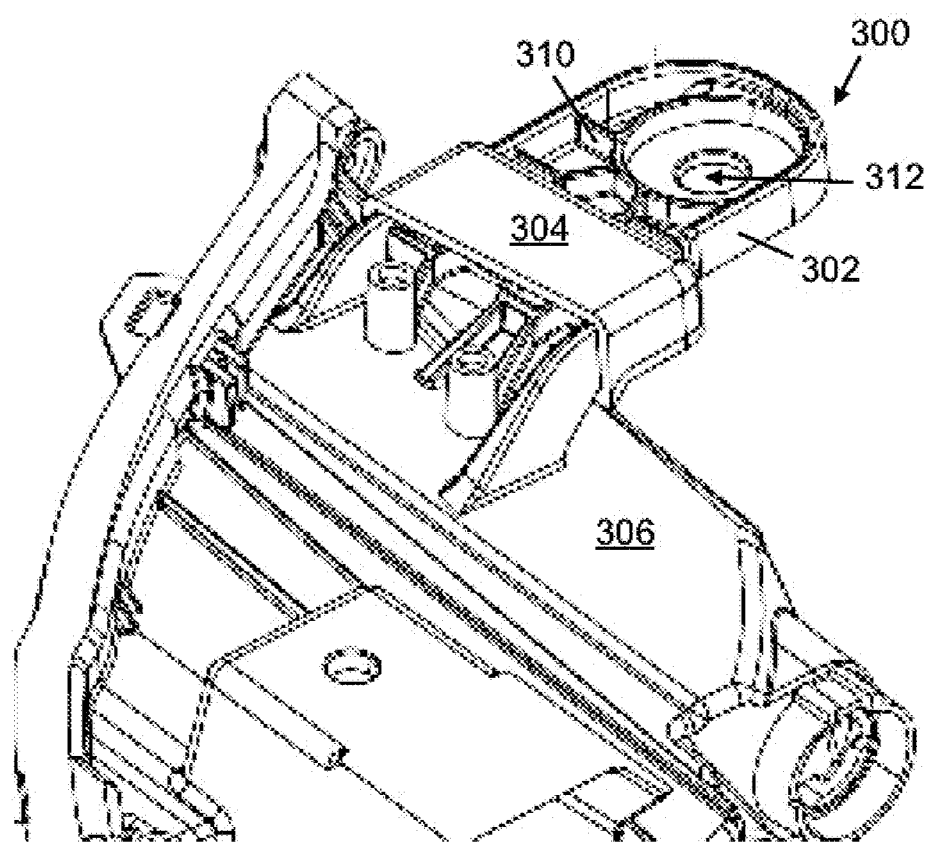
FIG. 3 shows a mounting tab comprising a mounting feature extending from a cover for receiving a portion of an automotive component, according to an embodiment.

FIG. 3 shows a mounting tab 300 comprising a mounting feature 302 extending from a cover 304 for receiving and at least partially encasing a portion of an automotive component 306, according to an embodiment. Cover 304 may have a generic shape. For example, an external and/or internal form factor of cover 304 may be substantially rectangular (as shown), substantially square, substantially cylindrical, or substantially pyramidal. In an embodiment, an external and/or internal form factor of cover 304 may be a complex form factor that substantially traces at least a portion of automotive component 306. Mounting feature 302 comprises a plurality of structural supports 310 and a bolt hole 312.

Figure 4A:
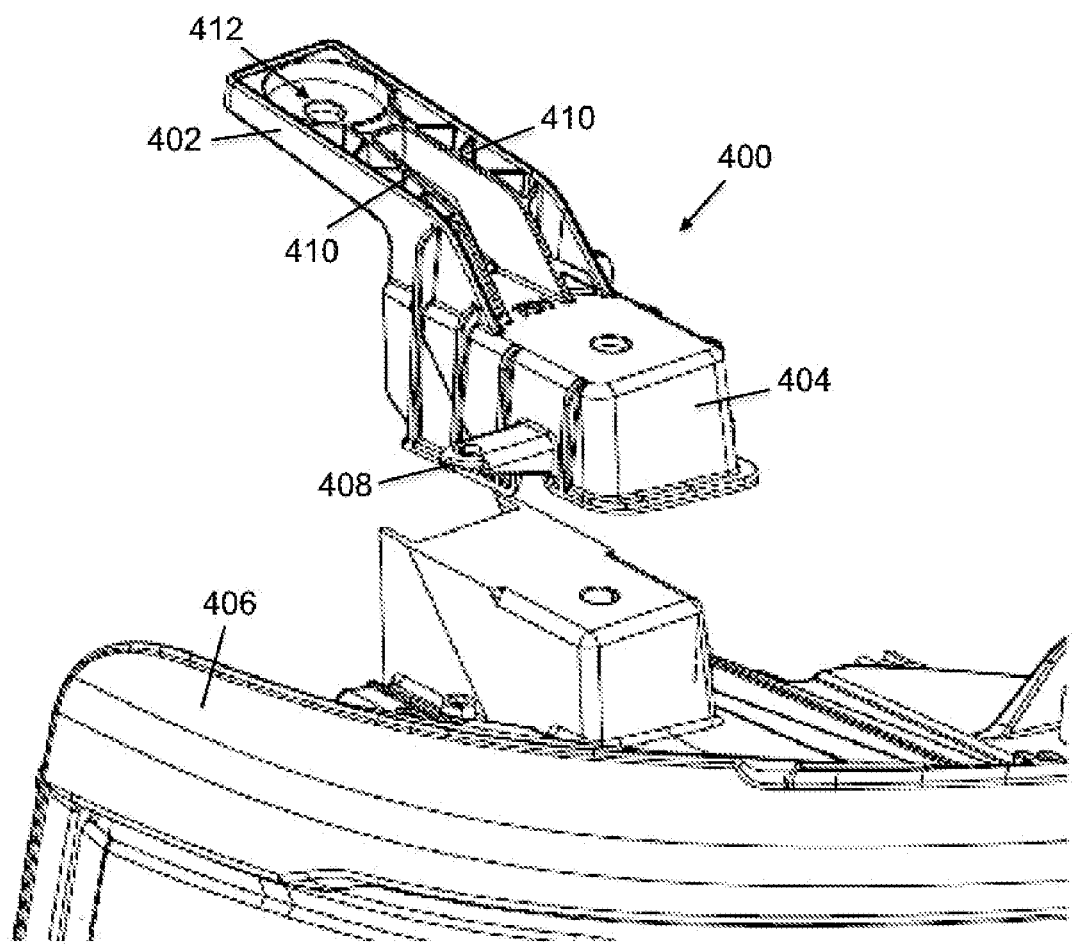
FIGS. 4A and 4B show a mounting tab comprising a mounting feature extending from a cover for receiving a portion of an automotive component, according to an embodiment.
Figure 4B:
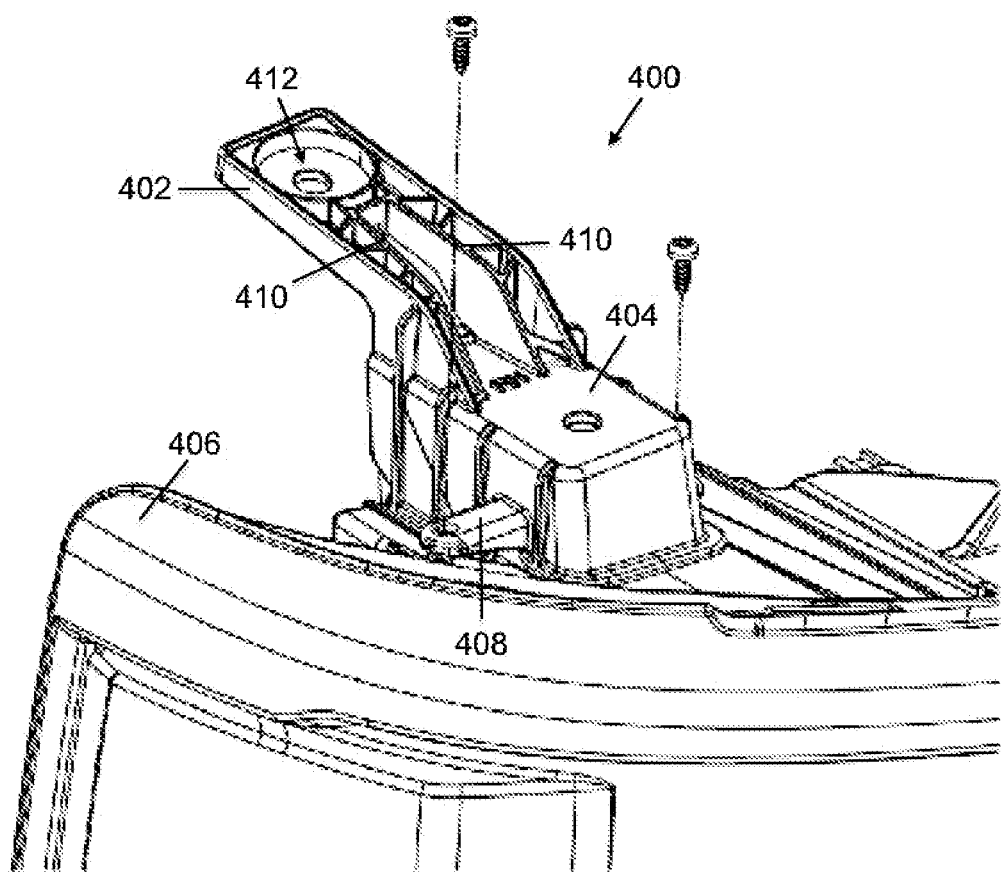

FIGS. 4A and 4B show a mounting tab 400 comprising a mounting feature 402 extending from a cover 404 for receiving and at least partially encasing a portion of an automotive component 406, according to an embodiment. Cover 404 comprises at least three walls that are substantially perpendicular to a plane, such as the substantially flat portion that sits atop automotive component 406. Tab 400 also comprises a mounting feature 402 extending from cover 404, and a pair of securement extensions 408. The elevated mounting feature 402 comprises a plurality of structural supports 410, including two raised legs, and a bolt hole 412. Securement extensions 408 receive means, such as screws, for fixing cover 404 to automotive component 406.

Figure 5A:
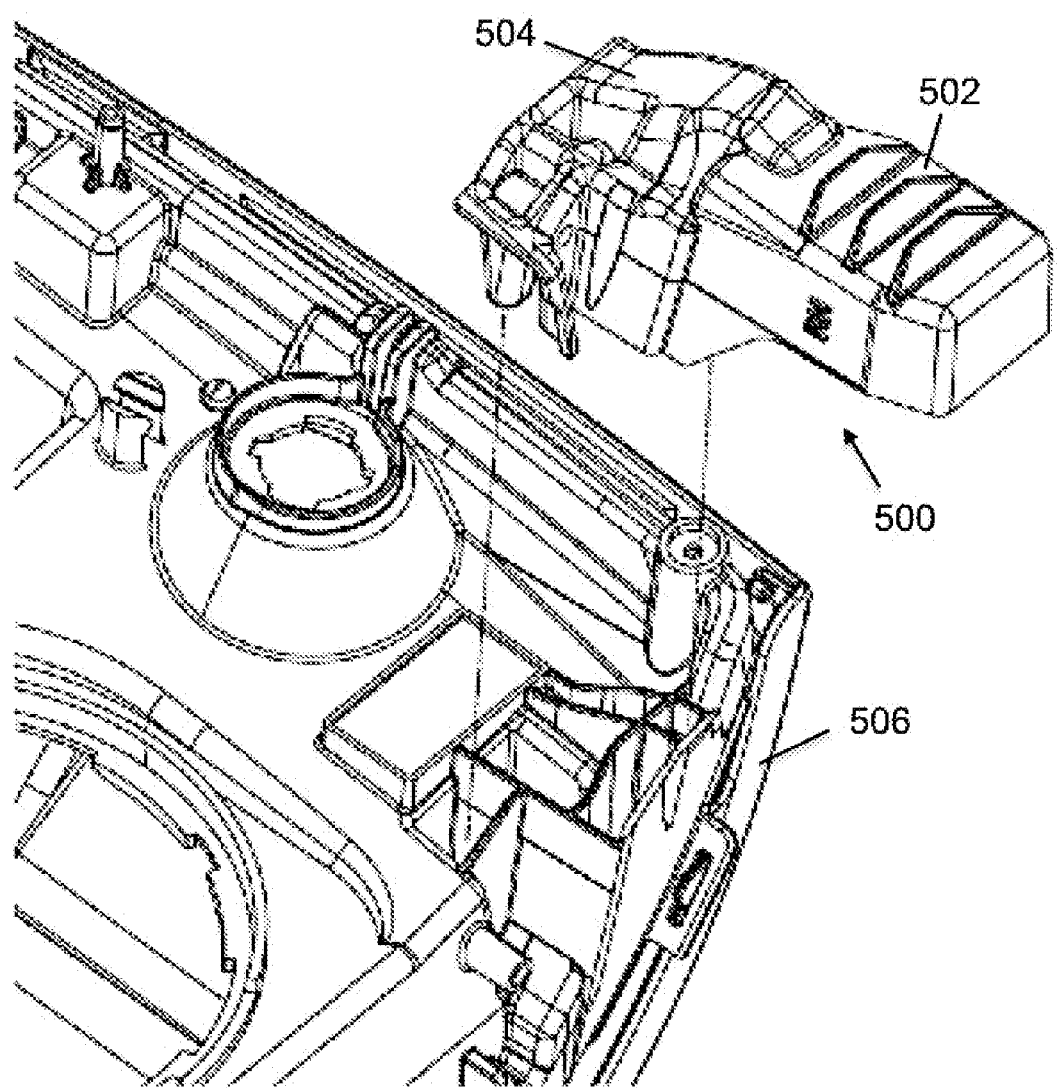
FIGS. 5A and 5B show a mounting tab comprising a mounting feature without a bolt hole extending from a cover for receiving a portion of an automotive component, according to an embodiment.
Figure 5B:
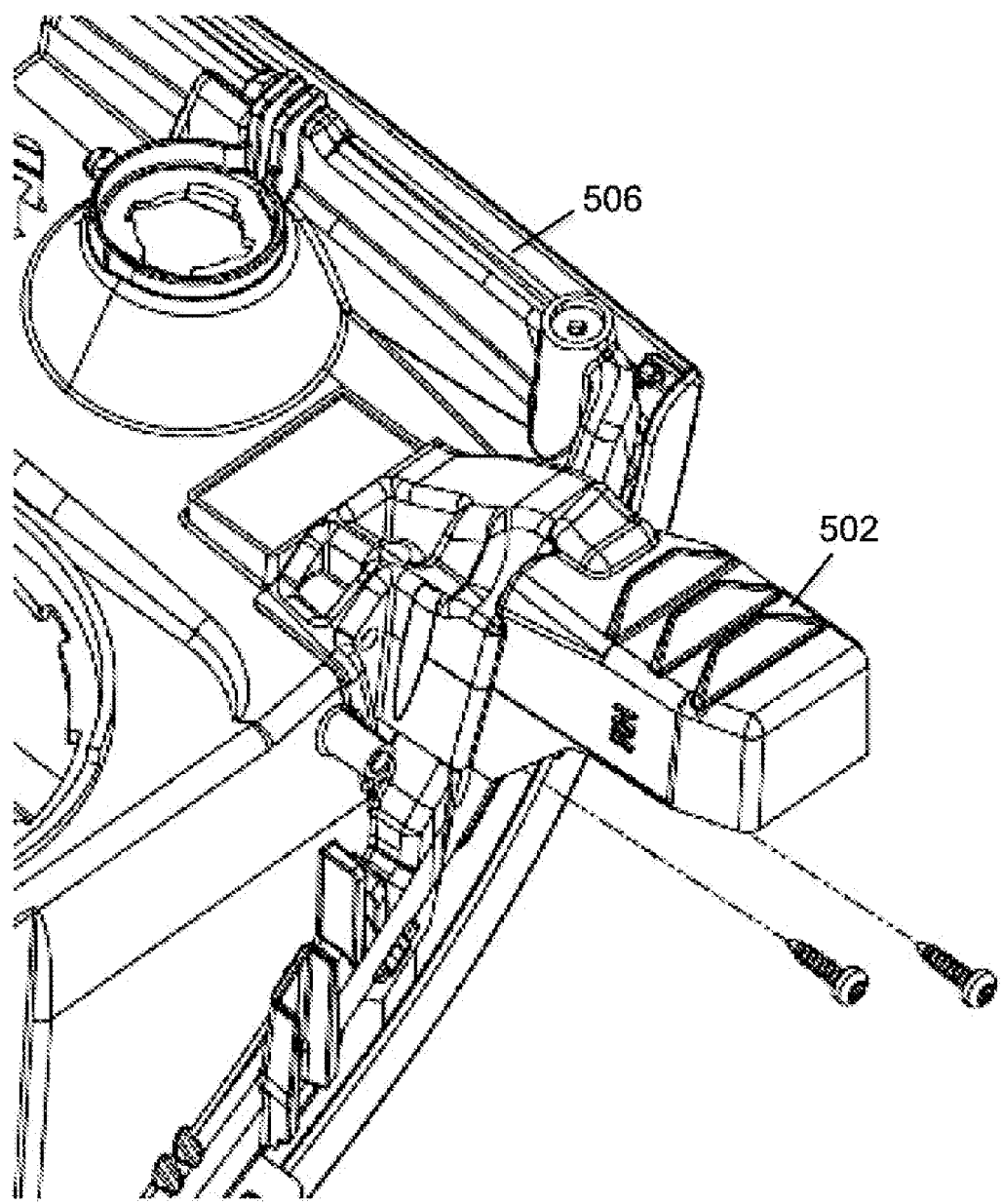

FIGS. 5A and 5B show a mounting tab 500 comprising a mounting feature 502 without a bolt hole extending from a cover 504 for receiving a portion of an automotive component 506, according to an embodiment. Cover 504 comprises a complex form factor that substantially traces the complex shape of at least a portion of automotive component 506.

Figure 6A:
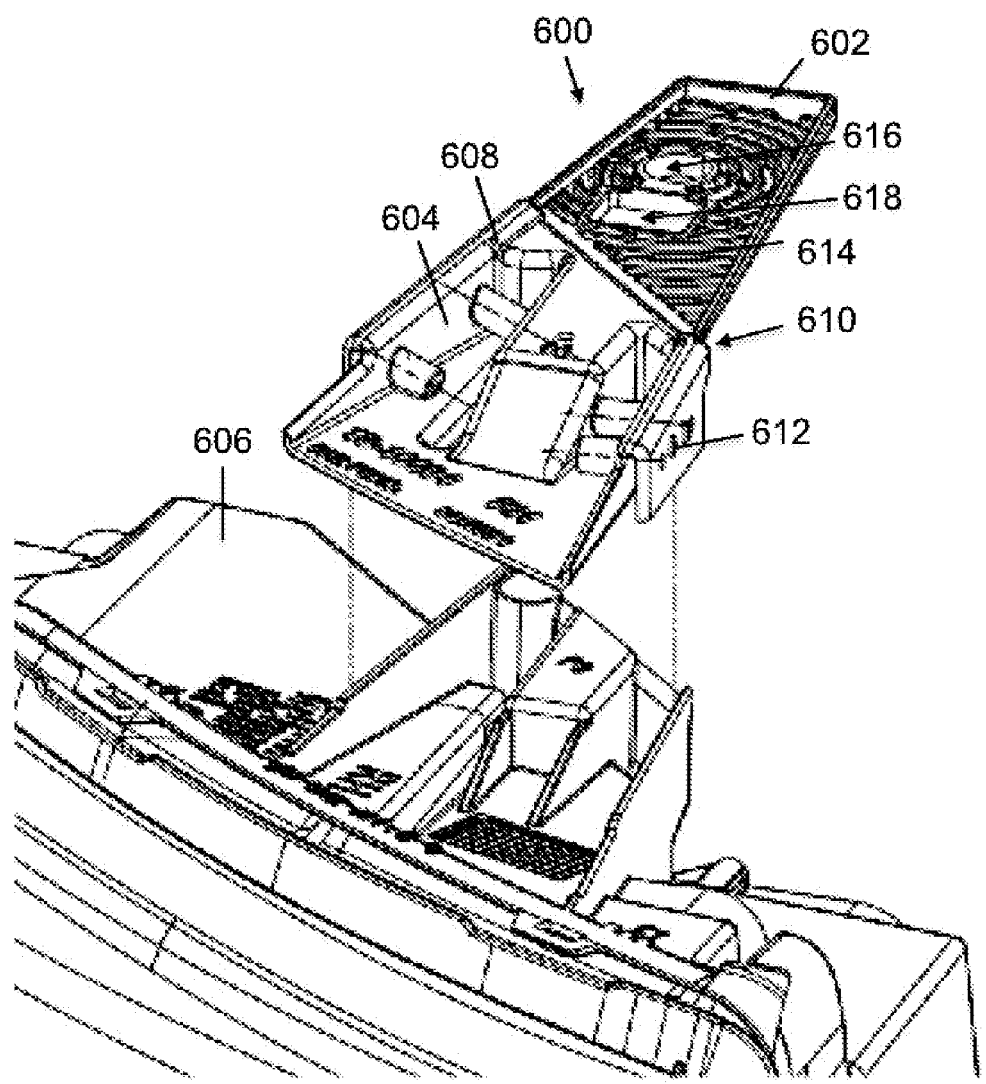
FIGS. 6A and 6B show a mounting tab comprising a mounting feature extending from a cover for receiving a portion of an automotive component, according to an embodiment.
Figure 6B:
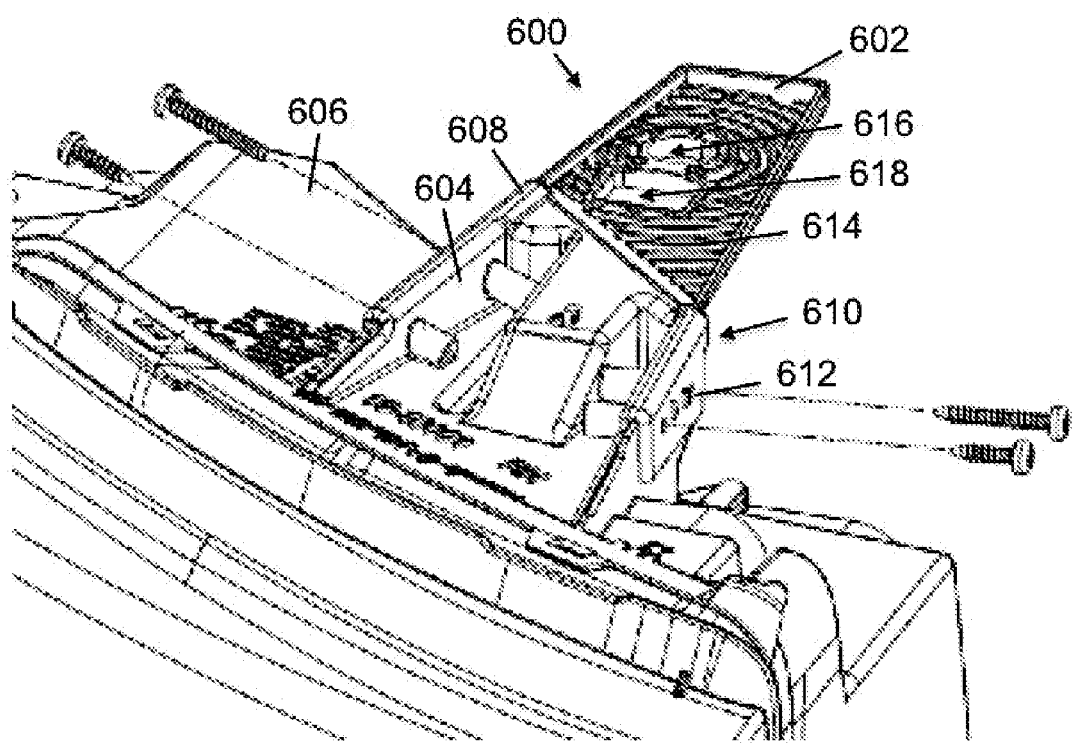
Figure 7A:
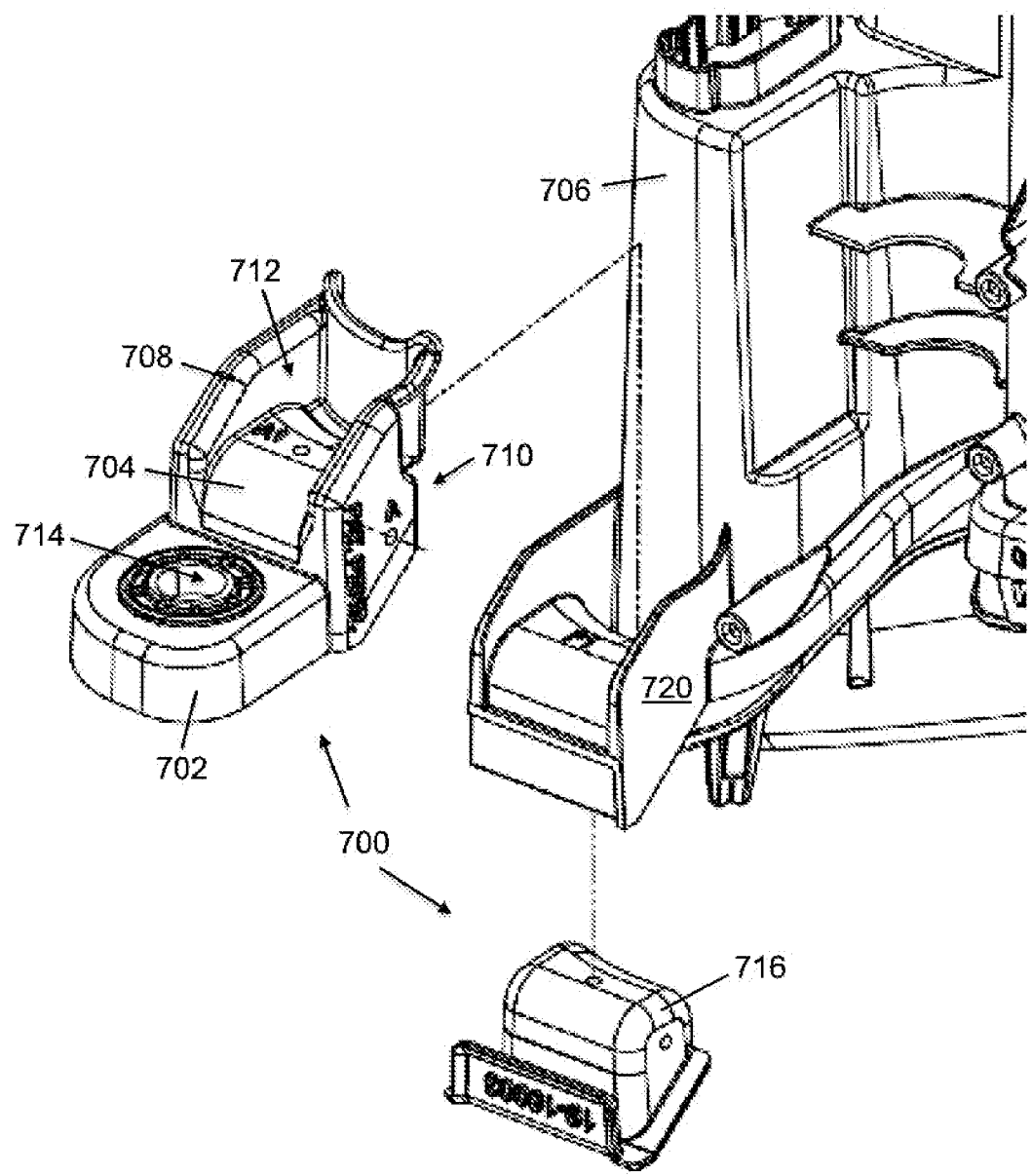
FIGS. 7A, 7B and 7C show a mounting tab comprising a mounting feature extending from a cover for receiving a portion of an automotive component, according to an embodiment.
Figure 7B:
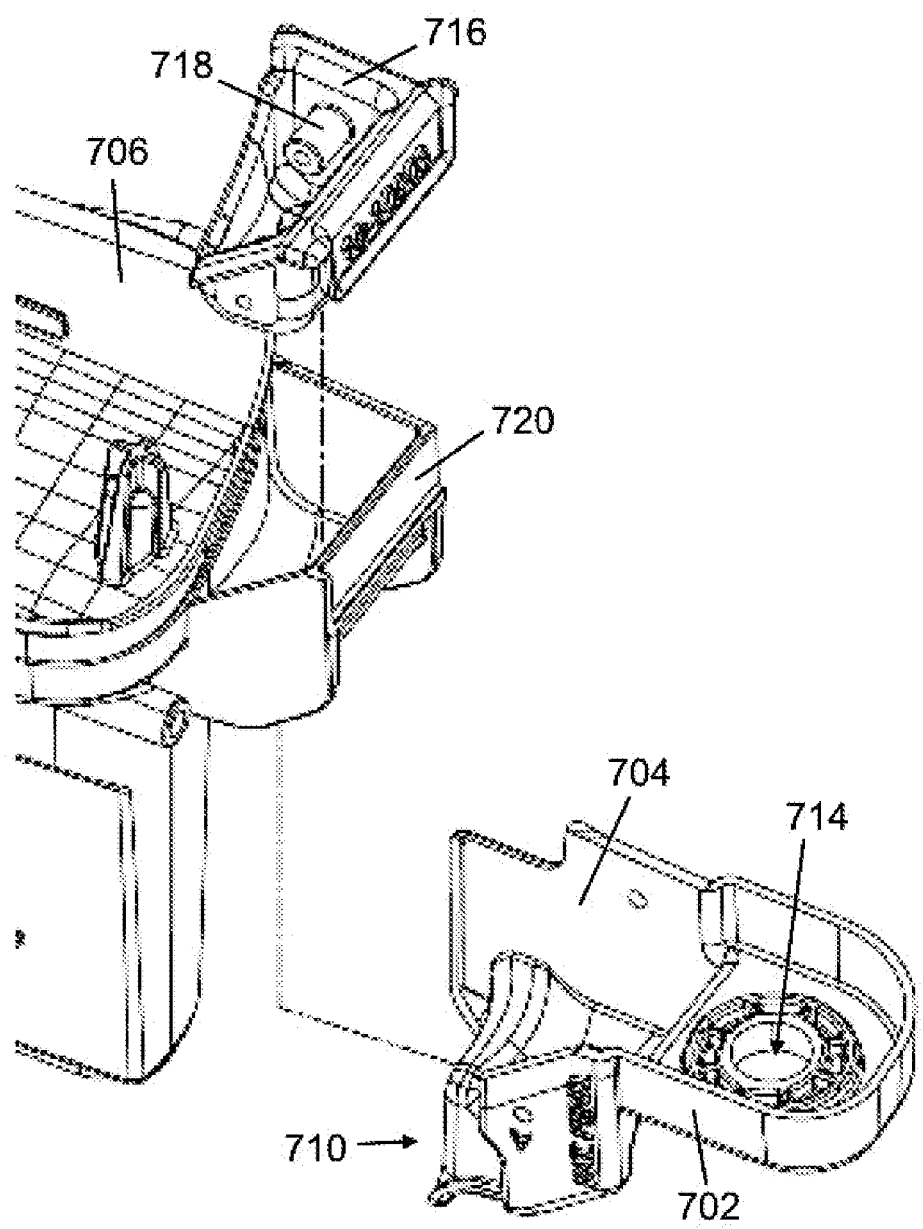
Figure 7C:
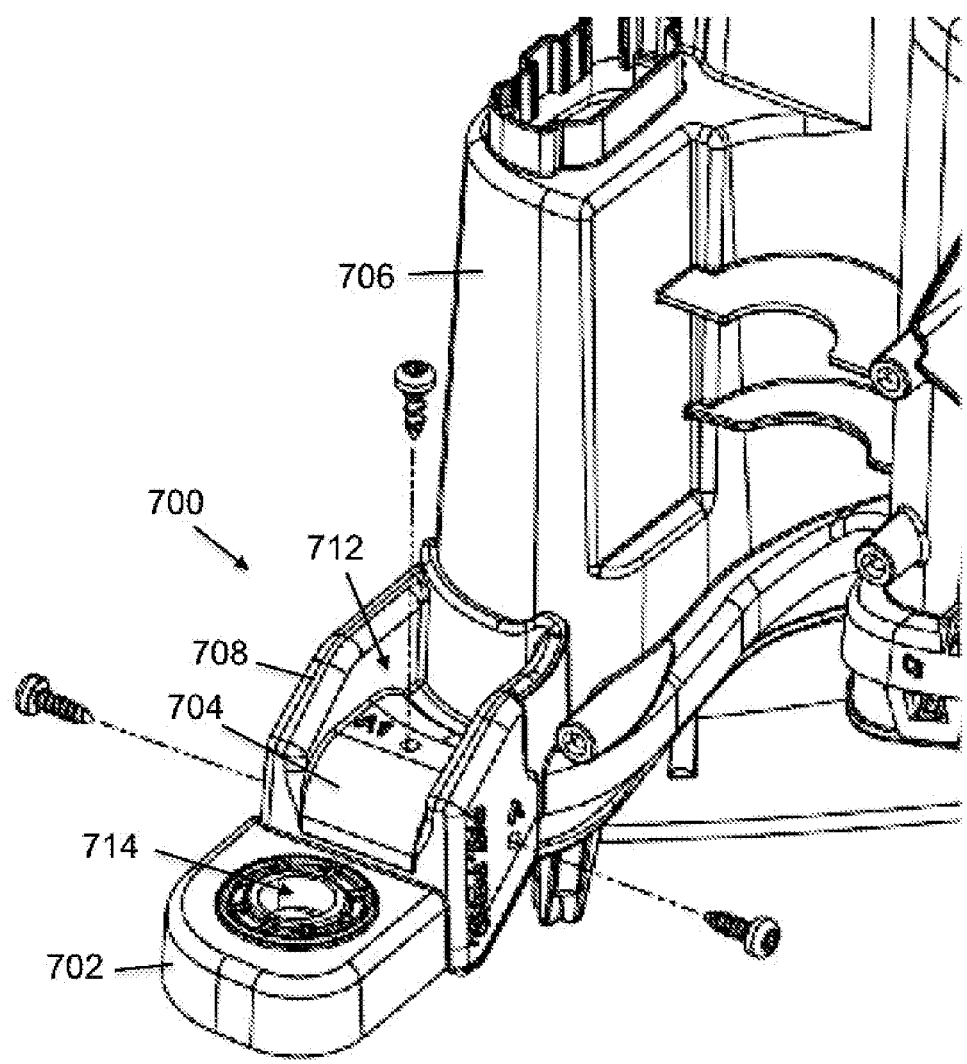
Figure 8A:
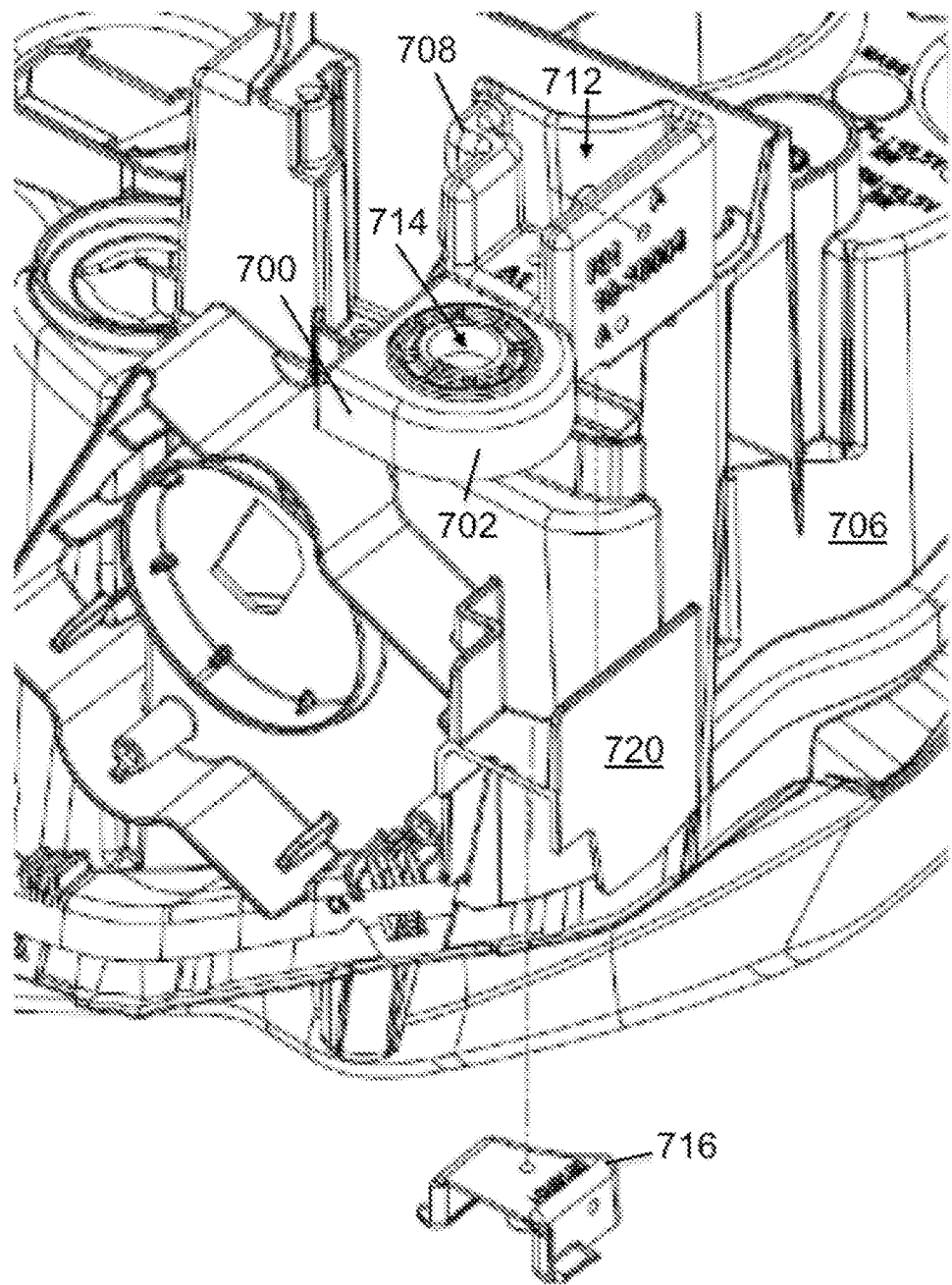
FIGS. 8A and 8B show a mounting tab comprising a mounting feature extending from a cover for receiving a portion of an automotive component, according to an embodiment.
Figure 8B:
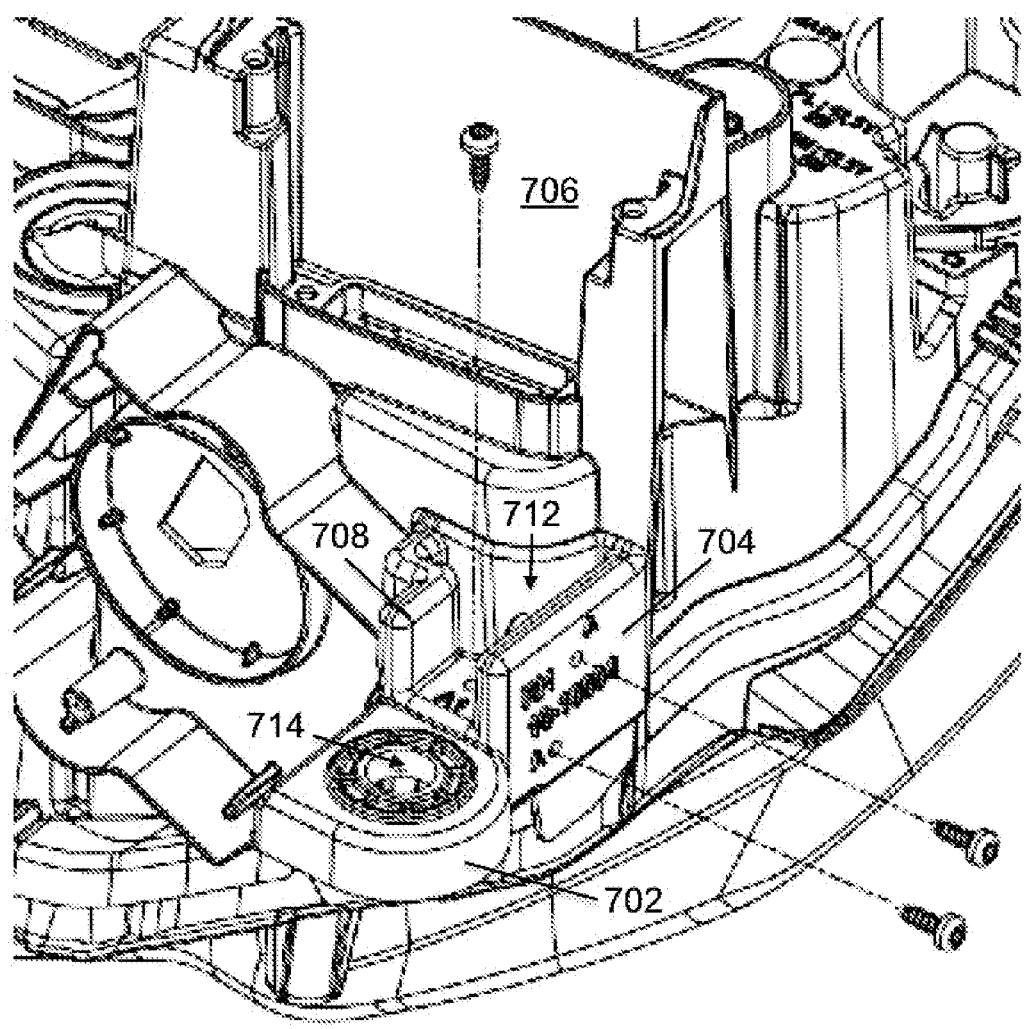

FIGS. 6A and 6B show a mounting tab 600 comprising a mounting feature 602 extending from a cover 604 for receiving a portion of an automotive component 606, according to an embodiment. Mounting tab 600 of FIGS. 6A and 6B comprises a pair of securement extensions 608 configured to at least partially wrap at least two surfaces of automotive component 606. Securement extensions 608 each form a substantially linear slot 610 that is open at both ends. Each securement extension 608 comprises a hole 612 aligned with a boss of cover 604. Mounting feature 602 of tab 600 shown in FIGS. 6A and 6B includes a plurality of structural supports 614, a bolt hole 616 and an additional opening 618. Additional opening 618 may, for example, receive or accommodate other objects when automotive component 606 is mounted in a vehicle.

FIGS. 7A, 7B, 7C, 8A and 8B show mounting tabs 700 comprising a mounting feature 702 extending from a cover 704 for receiving a portion of an automotive component 706, according to an embodiment. In both embodiments, mounting tabs 700 comprise a pair of securement extensions 708 configured to at least partially wrap at least two surfaces of automotive component 706. Securement extensions 708 each form a substantially linear slot 710 that is open at one end. Tabs 700 also include inserts 716 configured for placement opposite cover 704 and adjacent a broken portion 720 of an original mounting tab. Insert 716, which may or may not comprise a boss 718, acts as an anchor for fasteners passing through cover 704, broken portion 720, and insert 716. Mounting tabs 700 of FIGS. 7 and 8 differ in terms of the shapes of the cavities 712 formed by the external walls of cover 704 and the location of the holes for receiving means, such as screws, for fixing covers 704 to automotive component 706. In FIG. 8, one of the means for fixing cover 704 is disposed within cavity 712 formed by the cover. Mounting feature 702 of tab 700 includes a bolt hole 714.

Figure 9:
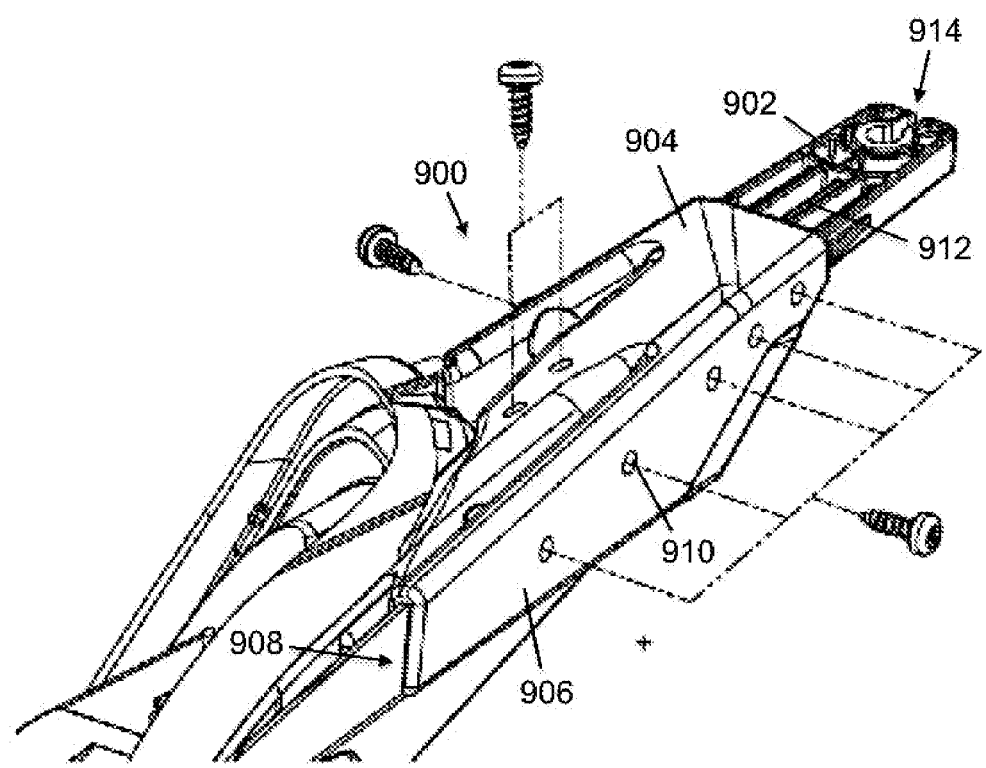
FIG. 9 shows a mounting tab comprising a mounting feature extending from a cover for receiving a portion of an automotive component, according to an embodiment.
Figure 10A:
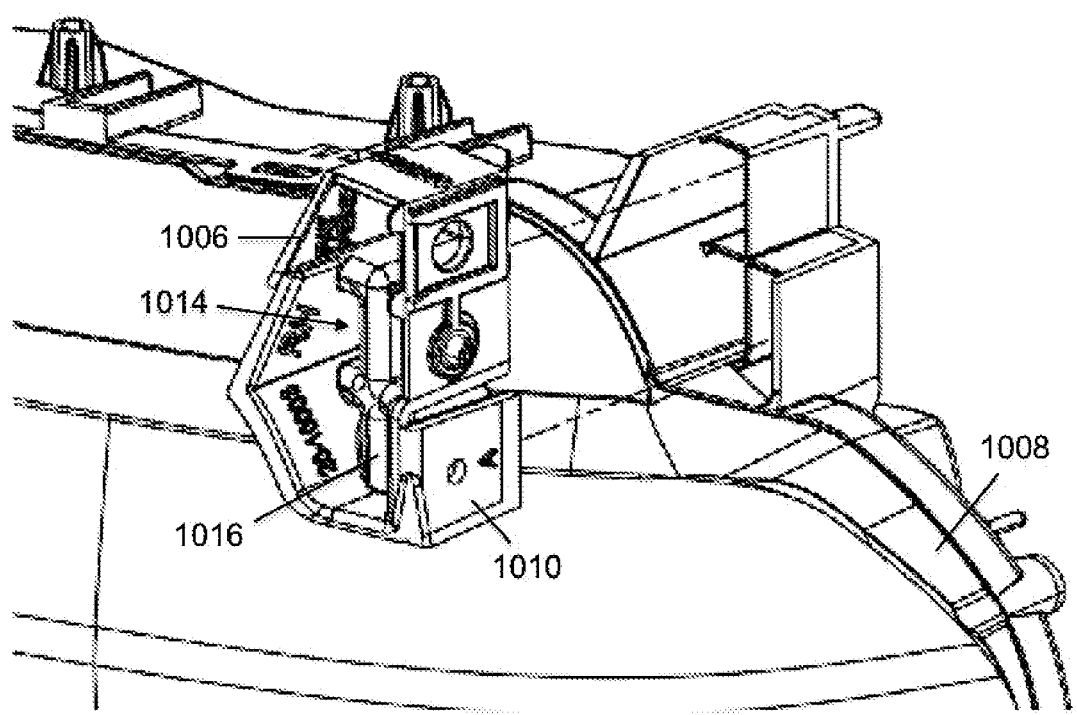
FIGS. 10A, 10B, 10C and 10D show a mounting tab comprising a mounting feature disposed within an exterior wall of a cover for receiving a portion of an automotive component, according to an embodiment.
Figure 10B:
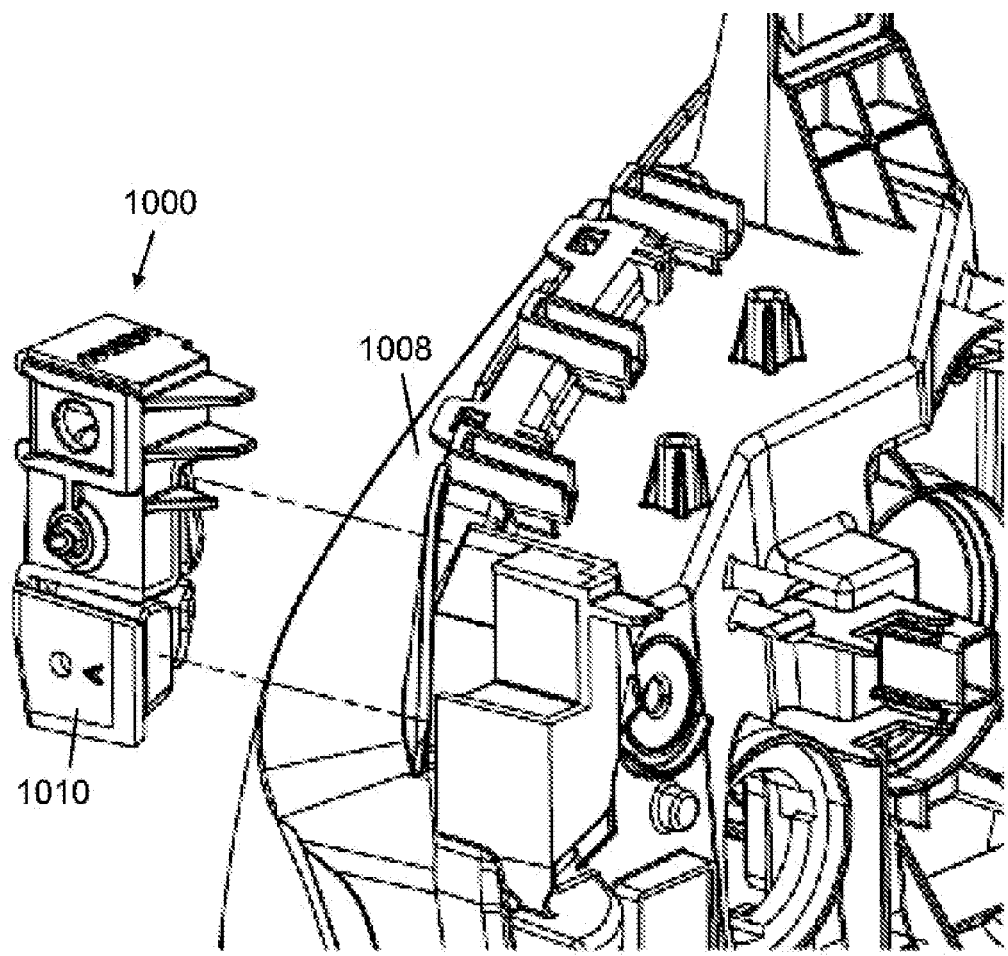
Figure 10C:
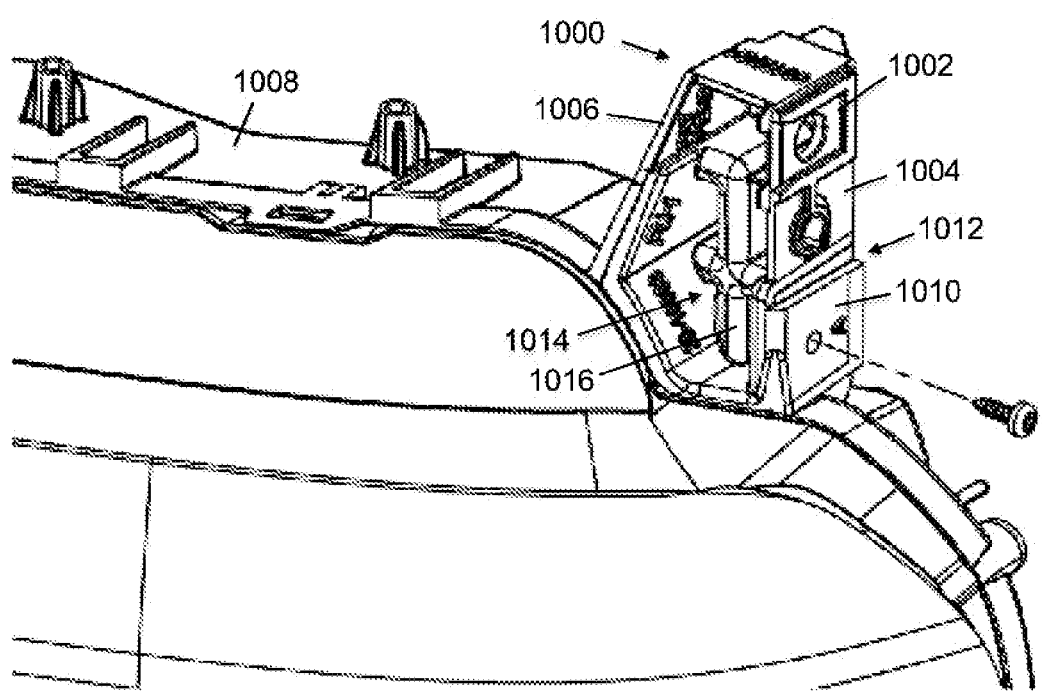
Figure 10D:
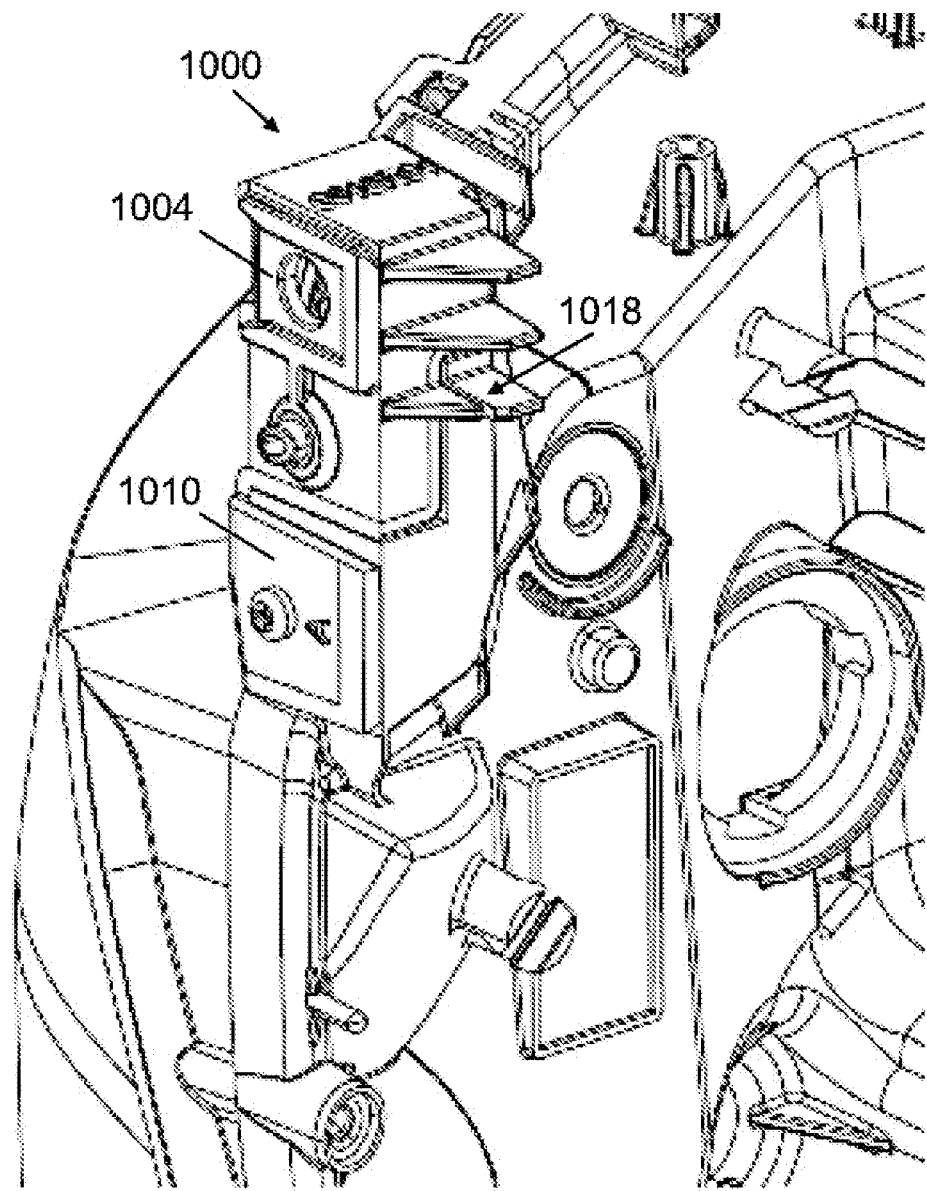

FIG. 9 shows a mounting tab 900 comprising a mounting feature 902 extending from a cover 904 for receiving a portion of an automotive component, according to an embodiment. Mounting tab 900 of FIG. 9 comprises a pair of securement extensions 906 configured to at least partially wrap at least two surfaces of an automotive component. Securement extensions 906 each form a substantially linear slot 908 that is open at least one end. Further, at least one of securement extensions 906 comprises a plurality of mounting holes 910. Mounting feature 902 comprises a plurality of structural supports 912 and a slotted bolt hole 914.

FIGS. 10A, 10B, 10C and 10D show a mounting tab 1000 comprising a mounting feature 1002 disposed within an exterior wall 1004 of a cover 1006 for receiving a portion of an automotive component 1008, according to an embodiment. Mounting tab 1000 comprises at least one securement extension 1010 configured to at least partially wrap at least two surfaces of automotive component 1008. Securement extension 1010 forms a substantially linear slot 1012 that is open at both ends. The embodiment of FIG. 10 comprises more than four external walls that are substantially perpendicular to a common plane, such that a cavity or pocket 1014 is formed. An optional reinforcing structure 1016 is shown disposed within cavity or pocket 1014. Further, as shown, an external wall of cover 1006 abuts a wall of automotive component 1008 in an end-to-end configuration, thereby forming a substantially planar contiguous surface 1018.

Figure 11A:
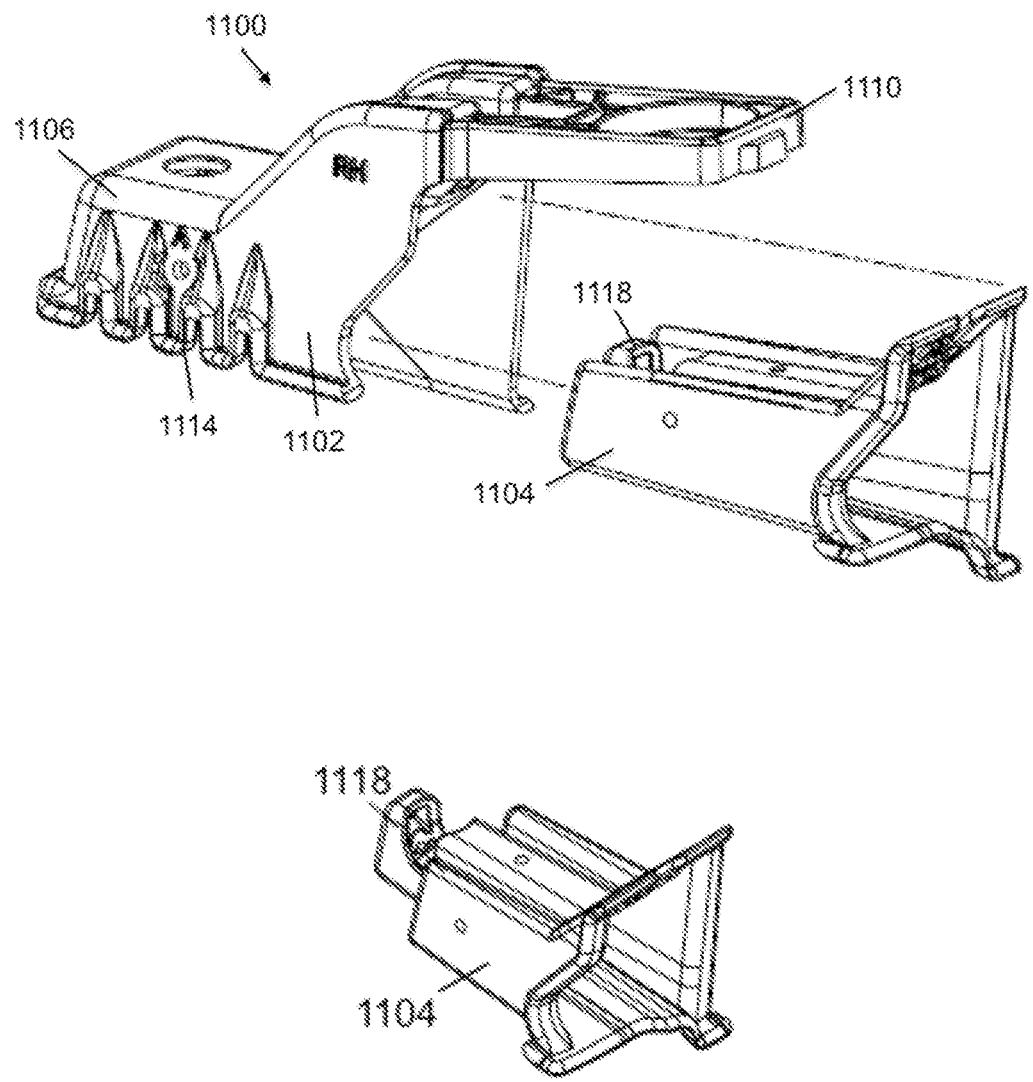
FIGS. 11A, 11B and 11C show a mounting tab comprising a mounting feature extending from a cover for receiving a portion of an automotive component and an insert configured for placement opposite the cover and adjacent a broken portion of an original mounting tab, according to an embodiment.
Figure 11B:
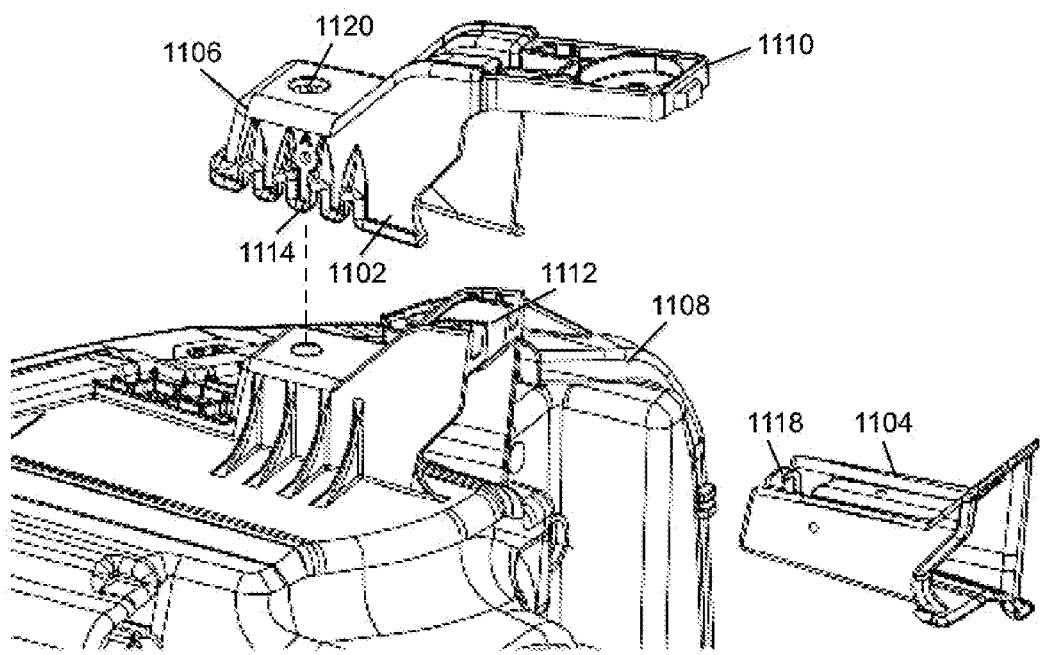
Figure 11C:
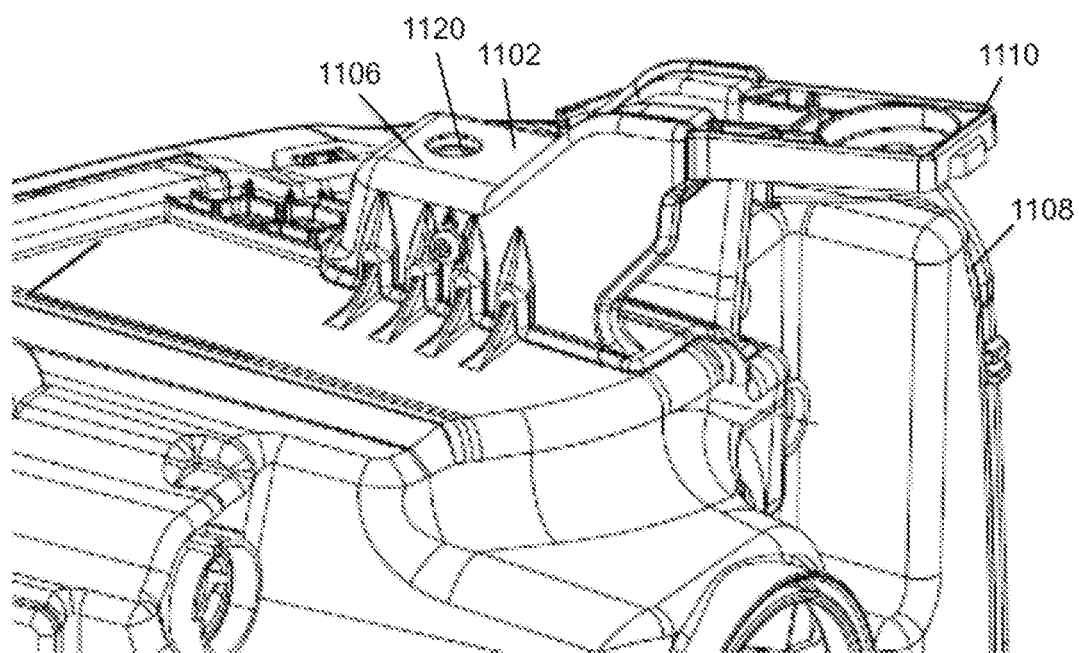

FIG. 11A shows a mounting tab 1100 comprising a first piece 1102 and a second piece 1104. First piece 1102 includes a cover 1106 for receiving a portion of an automotive component 1108 and a mounting feature 1110 extending from cover 1106. Second piece 1104 forms an insert configured for placement opposite cover 1106 and adjacent a broken portion 1112 of an original mounting tab. Insert 1104, which may or may not comprise a boss, acts as an anchor for fasteners passing through cover 1106, broken portion 1112 and insert 1104. Insert 1104 also masks the broken portion 1112 of the original mounting tab. In FIG. 11A, two versions of insert 1104 are shown. One version has shorter sidewalls, which reveals a hook 1118 that forms a pocket for receiving the end of a screw, bolt, or push pin inserted into opening 1120. In FIG. 11B, first piece 1102 of mounting tab 1100 is aligned with the back, top of a broken mounting tab 1112 and second piece 1104 of mounting tab 1100 is aligned with a front, bottom of broken mounting tab 1112. FIG. 11C shows mounting tab 1100 assembled to replace/repair broken mounting tab 1112, which is fully encased by the first 1102 and second 1104 pieces. As shown, the first 1102 and/or second 1104 pieces have complex form factors. For example, notched edges 1114 of first piece 1102 are configured to engage with structural ribs of the original mounting tab. Mounting tab 1100 includes a mounting feature 1110 to replace the mounting feature of the original mounting tab. As shown, mounting feature 1110 comprises a bolt hole.

Figure 12A:
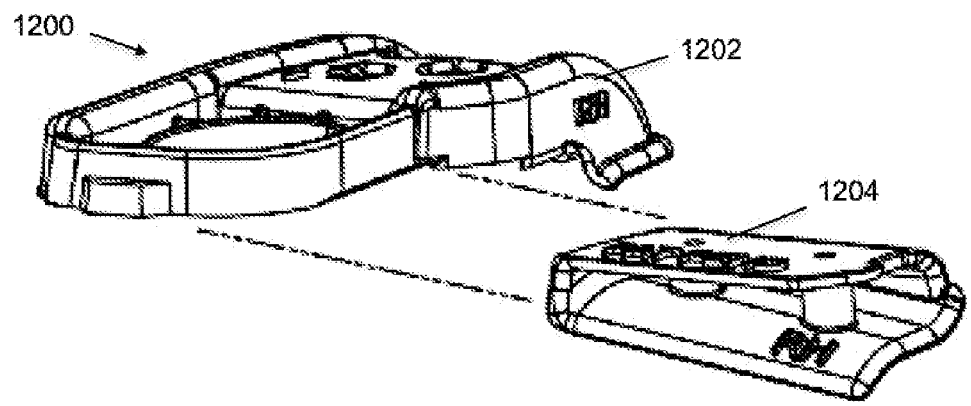
FIGS. 12A, 12B and 12C show a mounting tab comprising a mounting feature extending from a cover for receiving a portion of an automotive component and an insert configured for placement opposite the cover and adjacent a broken portion of an original mounting tab, according to an embodiment.
Figure 12B:
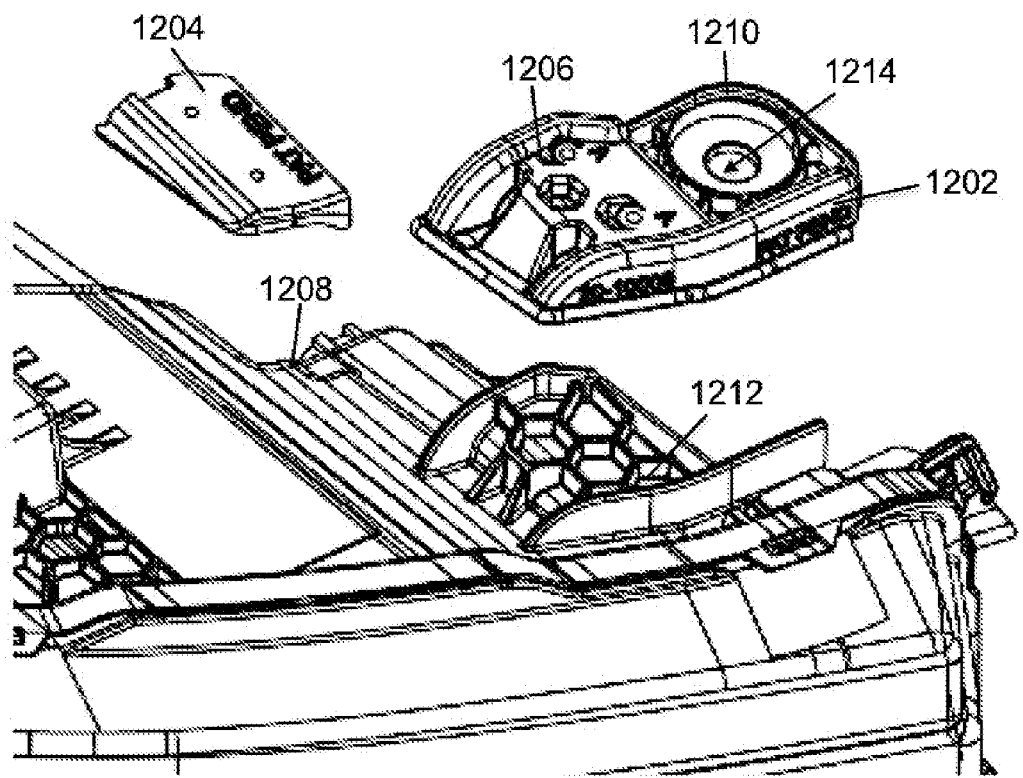
Figure 12C:
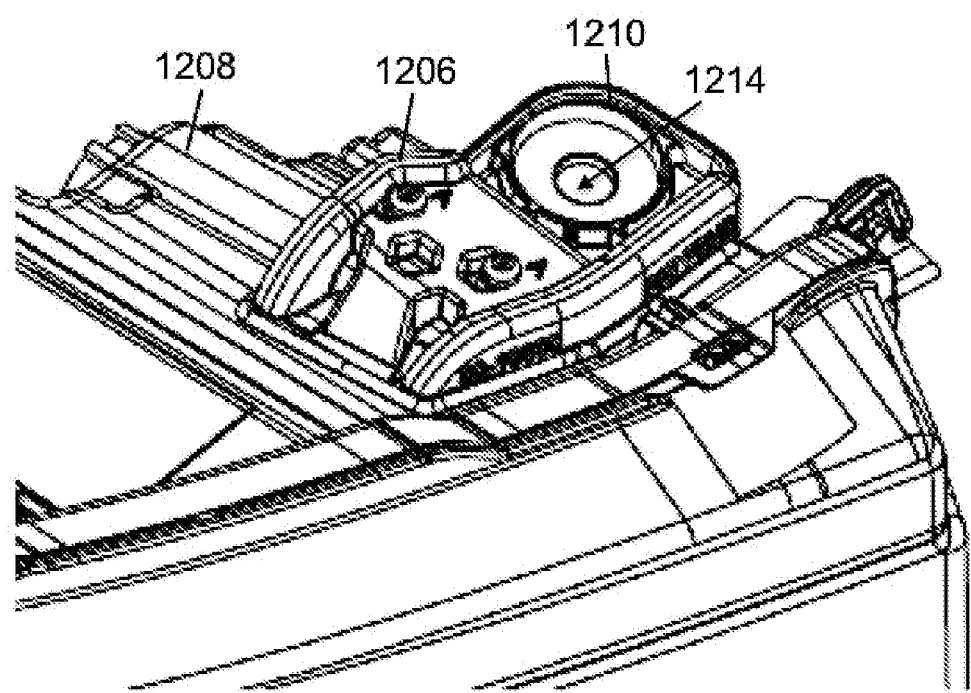

FIG. 12A shows a mounting tab 1200 comprising a first piece 1202 and a second piece 1204. First piece 1202 includes a cover 1206 for receiving a portion of an automotive component 1208 and a mounting feature 1210 extending from cover 1206. Second piece 1204 forms an insert that is configured for placement opposite cover 1206 and adjacent a broken portion 1212 of an original tab. The insert, which may or may not comprise a boss, acts as an anchor for fasteners passing through cover 1206, broken portion 1212, and second piece/insert 1204. In FIG. 12B, first piece 1202 of mounting tab 1200 is aligned with the back, top of a broken mounting tab 1212 and second piece 1204 of mounting tab 1200 is aligned with a front, bottom of broken mounting tab 1212. FIG. 12C shows mounting tab 1200 assembled to replace/repair broken mounting tab 1212, which is fully encased by the first 1202 and second 1204 pieces. Mounting tab 1200 includes mounting feature 1210 to replace the mounting feature of the original mounting tab. As shown, mounting feature 1210 comprises a bolt hole 1214.

Figure 13A:
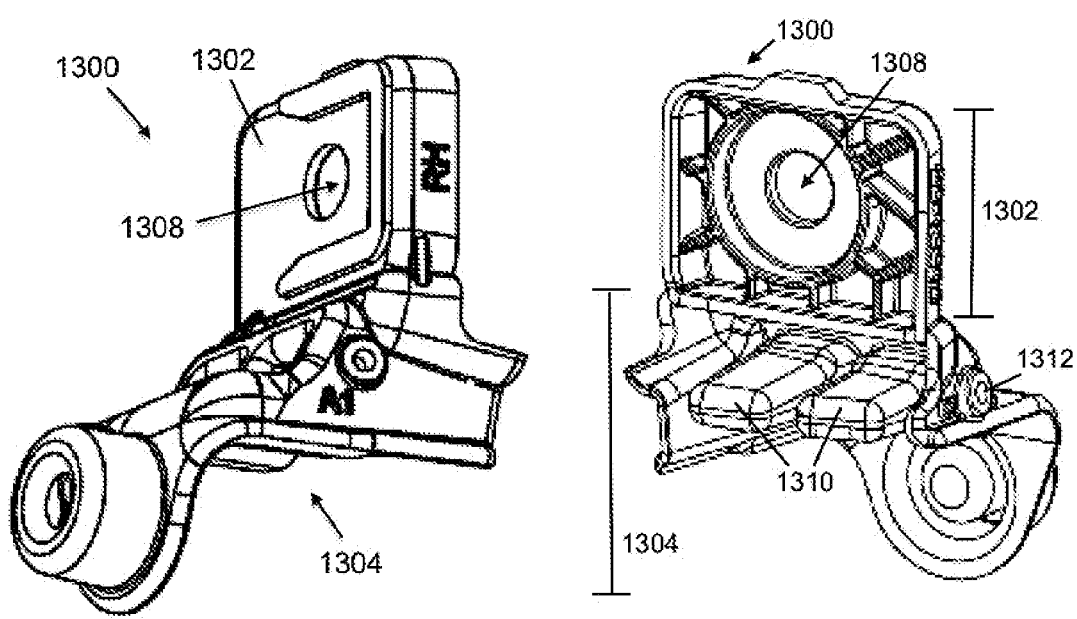
FIGS. 13A, 13B and 13C show a mounting tab comprising a mounting feature extending from a cover for receiving a portion of an automotive component, according to an embodiment.
Figure 13B:
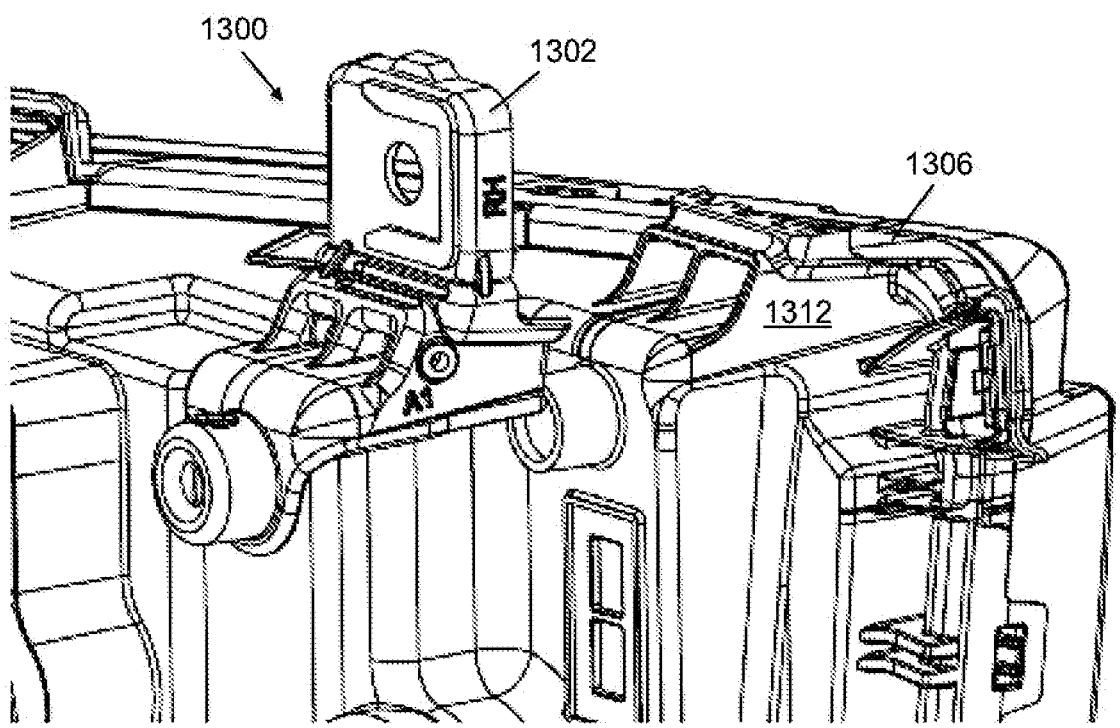
Figure 13C:
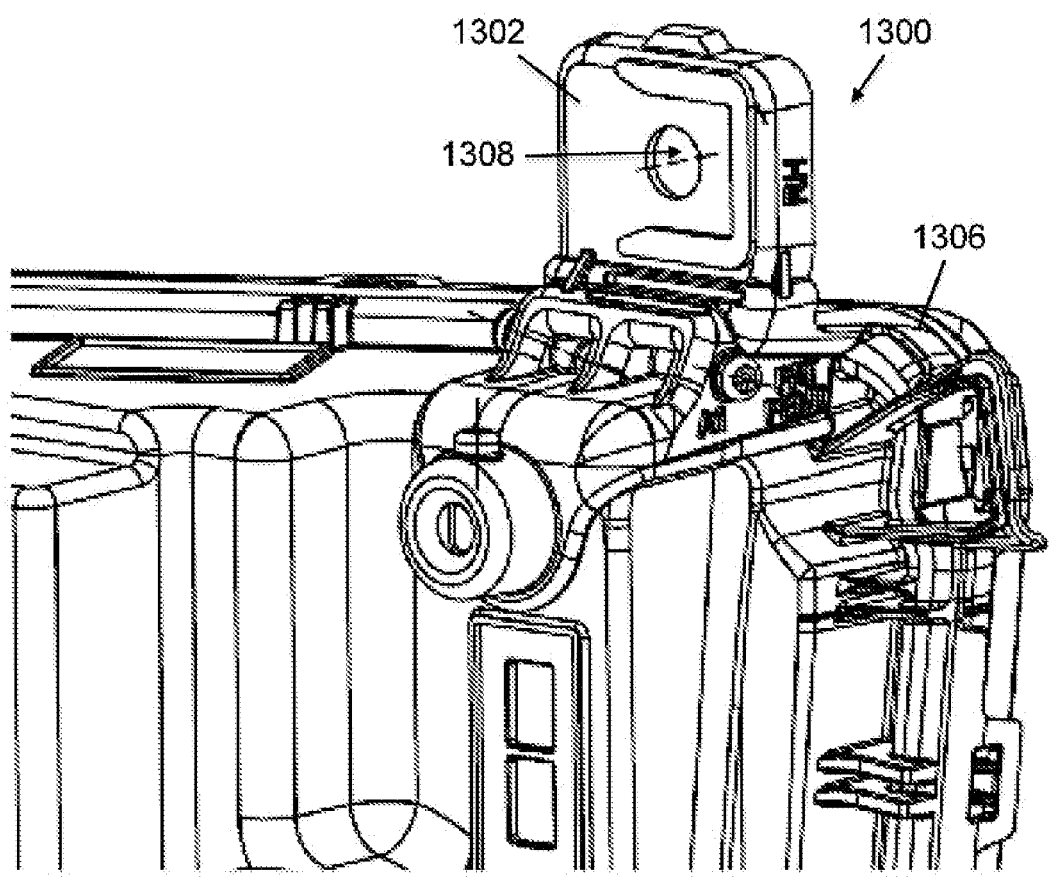

FIGS. 13A, 13B and 13C show a mounting tab 1300 comprising a mounting feature 1302 extending from a cover 1304 for receiving a portion of an automotive component 1306, according to an embodiment. Mounting tab 1300 includes mounting feature 1302 to replace the mounting feature of the original mounting tab. As shown, mounting feature 1302 comprises a bolt hole 1308. In the embodiment shown, cover 1304 includes inserts 1310, integrally formed with cover 1304, configured for placement within a broken portion 1312 of an original mounting tab and opposite an outer wall of cover 1304. Inserts 1310, which may or may not comprise a boss, act as anchors for fasteners passing through cover 1304, broken portion 1312, and insert 1310.

In an embodiment, a kit comprises one or more of the mounting tabs disclosed herein, instructions for using of the mounting tab(s), and optionally one or more fasteners and/or adhesives.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a tab" includes a plurality of such tabs and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements or limitation or limitations which is/are not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

What is claimed is:

1. A mounting tab for an automotive component, the mounting tab comprising:
a cover for receiving a damaged mounting tab portion of the automotive component;
wherein the cover comprises a first piece and a second piece for sandwiching the damaged mounting tab portion of the automotive component;
wherein the first piece and the second piece are complimentary male and female pieces that fully encase all edges and surfaces of the damaged mounting tab portion protruding from the automotive component;
wherein the first piece and the second piece are secured directly to one another; and a mounting feature extending from the cover in a first direction, the mounting feature including a hole having a central axis substantially perpendicular to the first direction.

2. The mounting tab of claim 1, wherein an external surface and/or an internal surface of the cover has a form factor that is substantially rectangular, substantially square, substantially cylindrical, or substantially pyramidal.

3. The mounting tab of claim 1, wherein an external surface and/or an internal surface of the cover comprises a complex form factor conforming to a complex shape of the damaged mounting tab portion of the automotive component.

4. The mounting tab of claim 1, wherein the first piece has at least one hole configured to align with a boss of the damaged mounting tab portion of the automotive component when the first piece and the damaged mounting tab portion are mated.

5. The mounting tab of claim 1, wherein the second piece has at least one hole configured to align with a boss of the first piece when the first piece and the second piece are mated.

6. The mounting tab of claim 1, wherein the first piece and the second piece are hinged together.

7. The mounting tab of claim 1, wherein the cover comprises at least three external walls oriented substantially perpendicular to a plane.

8. The mounting tab of claim 1, wherein the cover further comprises at least one securement extension for receiving means for fixing the cover to the automotive component.

9. The mounting tab of claim 8, wherein the securement extension is configured to at least partially wrap at least two surfaces of the automotive component.

10. The mounting tab of claim 9, wherein the securement extension forms a substantially linear slot.

11. The mounting tab of claim 10, wherein the substantially linear slot is open at one end or both ends.

12. The mounting tab of claim 10, wherein the securement extension comprises a plurality of mounting holes.

13. The mounting tab of claim 1, wherein an external wall of the cover abuts a wall of the automotive component in an end-to-end configuration, thereby forming a substantially planar contiguous surface.

14. The mounting tab of claim 1, wherein the mounting feature comprises one or more structural supports.

15. The mounting tab of claim 1, wherein the automotive component is selected from the group consisting of a vehicle headlight casing, a vehicle tail light casing, an interior light casing, a dashboard, a glove box, a compartment hatch, a steering wheel, a shift knob, a sensor module and a sun visor.

16. A kit for providing a mounting tab for an automotive component, comprising:
the mounting tab of claim 1; and
instructions for securing the cover to the automotive component.

17. A method of applying a mounting tab to an automotive component, the method comprising:
mating the mounting tab of claim 1 with the automotive component; and
securing the mounting tab to the automotive component.

18. The method of claim 17, wherein the step of securing comprises screwing, riveting, gluing, cementing, welding, epoxying and combinations thereof.

* * * * *